US010288020B2

(12) United States Patent
O'Brien

(10) Patent No.: US 10,288,020 B2
(45) Date of Patent: May 14, 2019

(54) DUAL AXIAL FAN WITH FLEXIBLE AIRFLOW AND BRACKET SYSTEM

(71) Applicant: TSI Products, Inc., Arlington, TX (US)

(72) Inventor: Stephen William O'Brien, Fort Worth, TX (US)

(73) Assignee: TSI Products, Inc., Arlington, TX (US)

( * ) Notice: Subject to any disclaimer, the term of this patent is extended or adjusted under 35 U.S.C. 154(b) by 380 days.

(21) Appl. No.: 15/009,161

(22) Filed: Jan. 28, 2016

(65) Prior Publication Data

US 2017/0067422 A1   Mar. 9, 2017

Related U.S. Application Data

(63) Continuation-in-part of application No. 14/846,427, filed on Sep. 4, 2015.

(51) Int. Cl.
| F24H 3/06 | (2006.01) |
| E06B 7/03 | (2006.01) |
| F24F 7/00 | (2006.01) |
| F24F 13/08 | (2006.01) |
| E04G 3/00 | (2006.01) |
| A47F 5/00 | (2006.01) |
| A47H 1/10 | (2006.01) |
| F02M 35/10 | (2006.01) |
| F04D 25/16 | (2006.01) |
| B60H 1/00 | (2006.01) |

(52) U.S. Cl.
CPC ... *F02M 35/10091* (2013.01); *B60H 1/00464* (2013.01); *B60H 1/00535* (2013.01); *F04D 25/166* (2013.01); *F24F 2221/36* (2013.01)

(58) Field of Classification Search
CPC .............. F04D 25/166; B60H 1/00464; B60H 1/00535; B60H 2001/2278; F24F 2221/36
USPC ............... 165/122; 454/217, 246; 248/287.1, 248/298.1, 299.1
See application file for complete search history.

(56) References Cited

U.S. PATENT DOCUMENTS

| 1,910,630 | A | * | 5/1933 | Nichols .............. B60H 1/00457 248/232 |
| 2,169,693 | A | | 8/1939 | Haynes |
| 4,690,209 | A | | 9/1987 | Martin |
| 6,068,046 | A | | 5/2000 | Pommier et al. |
| 6,940,716 | B1 | * | 9/2005 | Korinsky .................. G06F 1/20 165/121 |
| 7,159,651 | B2 | | 1/2007 | Ito et al. |
| 2007/0081888 | A1 | | 4/2007 | Harrison |

(Continued)

FOREIGN PATENT DOCUMENTS

WO    WO 2005050026 A1 *  6/2005  ........... F04D 25/166

*Primary Examiner* — Paul Alvare
(74) *Attorney, Agent, or Firm* — Hitchcock Evert LLP

(57) ABSTRACT

A flexible airflow system providing customizable components for mounting, directing airflow and/or modifying airflow. The system may include a dual fan apparatus for providing heated or cooled air which is compact fit within limited spaces. The dual fan apparatus includes two axial fans on opposing sides of a thermal exchange component which operate in coordination to move air in one direction at a time through the apparatus. The dual fan apparatus increases airflow and thermal transfer efficiency through the thermal exchange component. The system may also include a flexible bracket system and/or a flexible ventilation system to facilitate custom configurations for the airflow system.

20 Claims, 15 Drawing Sheets

(56) References Cited

U.S. PATENT DOCUMENTS

| | | |
|---|---|---|
| 2008/0110185 A1 | 5/2008 | Veettil et al. |
| 2011/0308266 A1 | 12/2011 | Lafleur |
| 2012/0011869 A1 | 1/2012 | Kondo et al. |
| 2012/0090814 A1* | 4/2012 | Crosier ............... B60H 1/00028 165/59 |

* cited by examiner

DUAL AXIAL FAN WITH FLEXIBLE AIRFLOW AND BRACKET SYSTEM

CROSS-REFERENCE TO RELATED APPLICATION

This application is a continuation-in-part of U.S. application Ser. No. 14/846,427, entitled "Dual Axial Fan" and filed on Sep. 4, 2015, which is incorporated herein by reference.

FIELD OF THE DISCLOSURE

The invention relates generally to the field of vehicle heating and air conditioning systems.

BACKGROUND

Heater and air conditioning systems are common in many automobiles and have been incorporated into other types of vehicles. Vehicle heaters use a fan blowing air across a heater core or heat source and to the passenger. Vehicle air conditioning systems use a fan blowing air across an evaporator and to the passenger. The size of the heating and air conditioning systems is often dictated by the space restrictions within the given vehicle.

SUMMARY

The present disclosure provides an apparatus for improved heating and/or air conditioning a vehicle. The apparatus increases the heating and/or cooling effectiveness while maintaining a compact design that allows for the apparatus to be used within the limited space available in vehicles such as small automobiles, all-terrain vehicles (ATVs), boats, snow mobiles, tractors, trailers, farm equipment, motorcycles, golf carts, etc. While the apparatus is discussed in the context of vehicles, the apparatus may also be used in other environments such as stationary equipment and containers.

Embodiments of the apparatus use a dual fan configuration to improve the heat transfer within the same limited space available for the thermal exchange component and increase the velocity of air passing through the thermal exchange component. One fan is located on the first side of the thermal exchange component and the other fan is located on the second side of the thermal exchange component. The two fans operate in conjunction to maximize the temperature transfer occurring as the air passes through the thermal exchange component. A first fan operates to pull air from the ambient and push air into the thermal exchange component while the second fan operates to pull the temperature modified air from the thermal exchange component and push the temperature modified air out of a vent.

Some embodiments of the apparatus implement axial fans having a central motor which rotates the fan blades around the central axis of the motor. During operation the fans counter rotate to create a push-pull effect through the thermal exchange component.

Embodiments of the present disclosure include air ducts for the ingress and egress of air on the opposite side of each fan from the thermal exchange component. Some embodiments of the air ducts include ports with a vent or other faceplate. Some embodiments of the air ducts include multiple ports each with a vent or other faceplate. In some embodiments, the vent or faceplate is designed to direct the flow of air through the port. Embodiments of the vent or faceplate may be designed to prevent occlusion of the port.

Embodiments of the thermal exchange component may include a heating element (such as a heat exchanger, electric coil, heater core, etc.), a cooling element (such as an air conditioner evaporator) or a combination component comprising a heating element and a cooling element.

Some embodiments include a flexible bracket system for an air modification apparatus. Embodiments of the flexible bracket system include a base bracket which attaches to the air modification apparatus and interchangeable accessory bracket components. Embodiments of the accessory bracket components may include a wing bracket, "L" bracket and other bracket components. Some embodiments of the bracket components are designed to allow articulation to provide a range of bracket configurations.

Some embodiments include a flexible ventilation system for an air modification apparatus. Embodiments of the flexible ventilation system include a base bracket and interchangeable ventilation components. Embodiments of the ventilation components may include duct connection components, vents and other ventilation components. Duct components may be one or more duct ports which are directed in various directions to connect to a duct system directing the airflow to one or more desired locations. Embodiments of the flexible ventilation system facilitate multiple configurations of the ventilation system components.

A BRIEF DESCRIPTION OF THE DRAWINGS

Embodiments will now be described, by way of example only, with references to the accompanying drawings in which.

DETAILED DESCRIPTION

While this invention may be embodied in many different forms, there will herein be described in detail preferred embodiments of the invention with the understanding that the present disclosure is to be considered as an exemplification of the principles of the invention and is not intended to limit the broad aspects of the invention to the embodiments illustrated. As used herein, the terms "and", "or" and "and/or" may be used interchangeably. It will be understood that the invention may be embodied in other specific forms without departing from the spirit or central characteristics thereof. The present embodiments, therefore, are to be considered in all respects as illustrative and not restrictive, and the invention is not to be limited to the details given herein.

Figure 1:
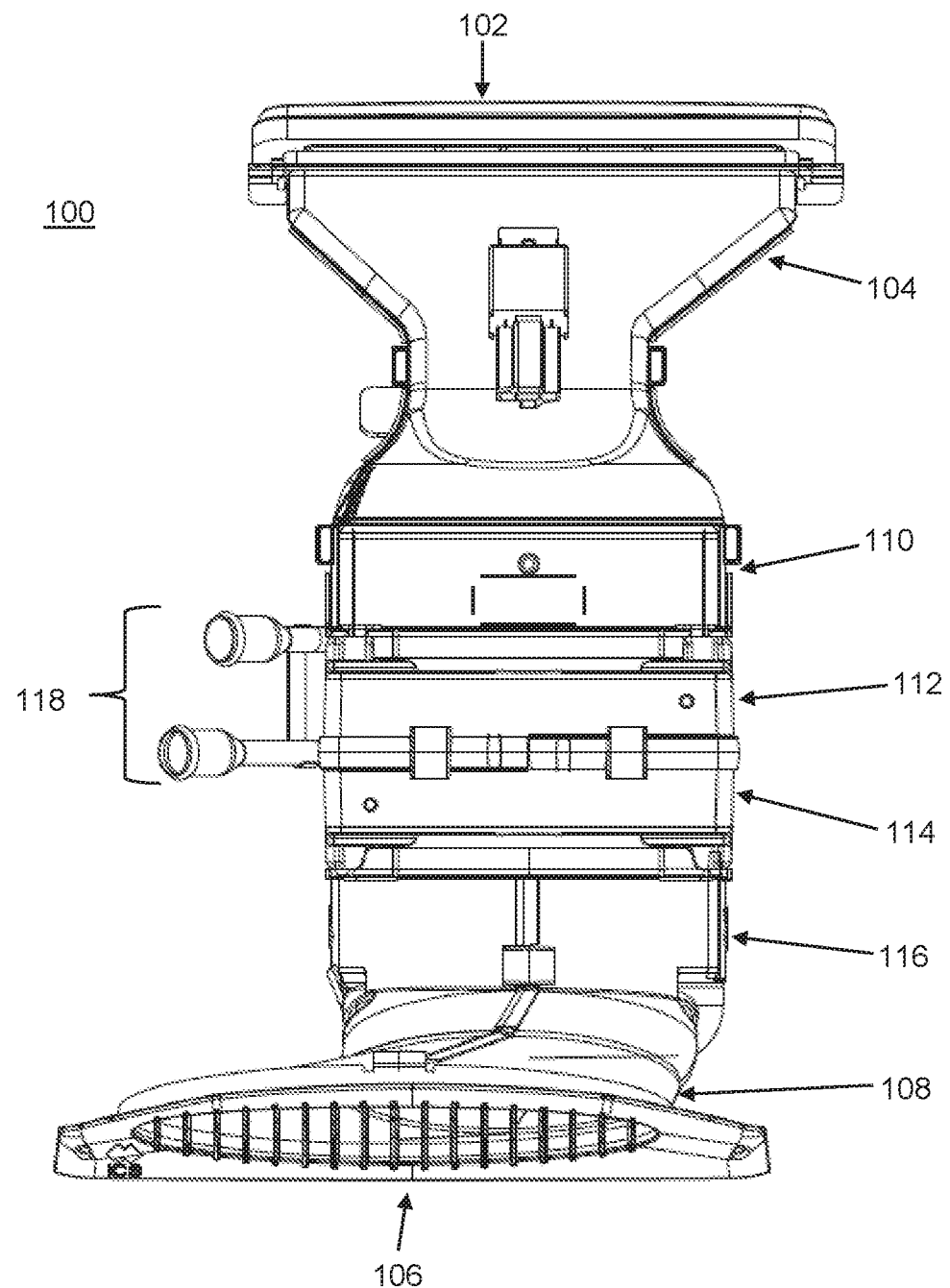
FIG. 1 is a front view of an embodiment of a dual fan design of the present disclosure.
Figure 2:
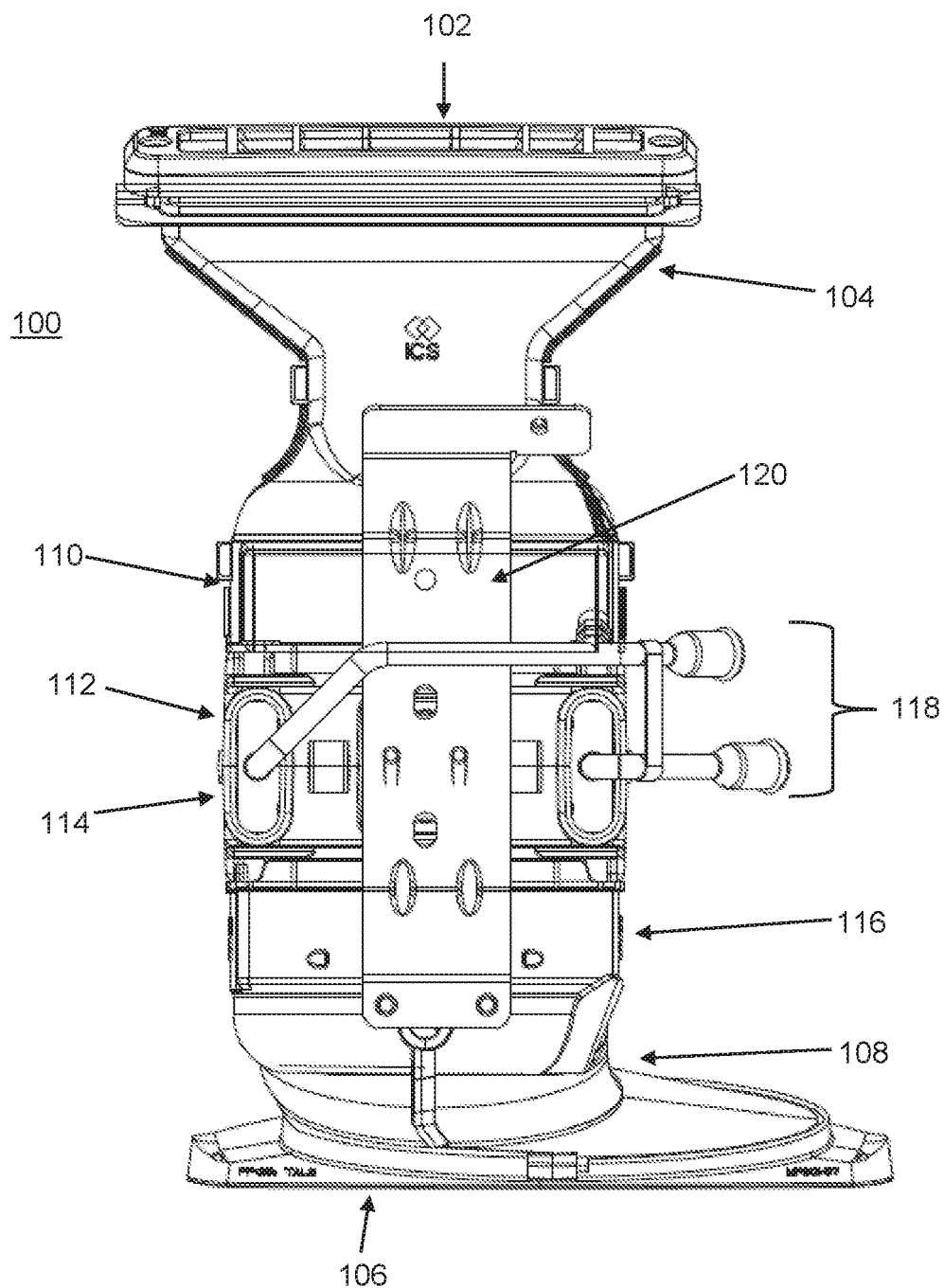
FIG. 2 is a back view of an embodiment of a dual fan design of the present disclosure.
Figure 3:
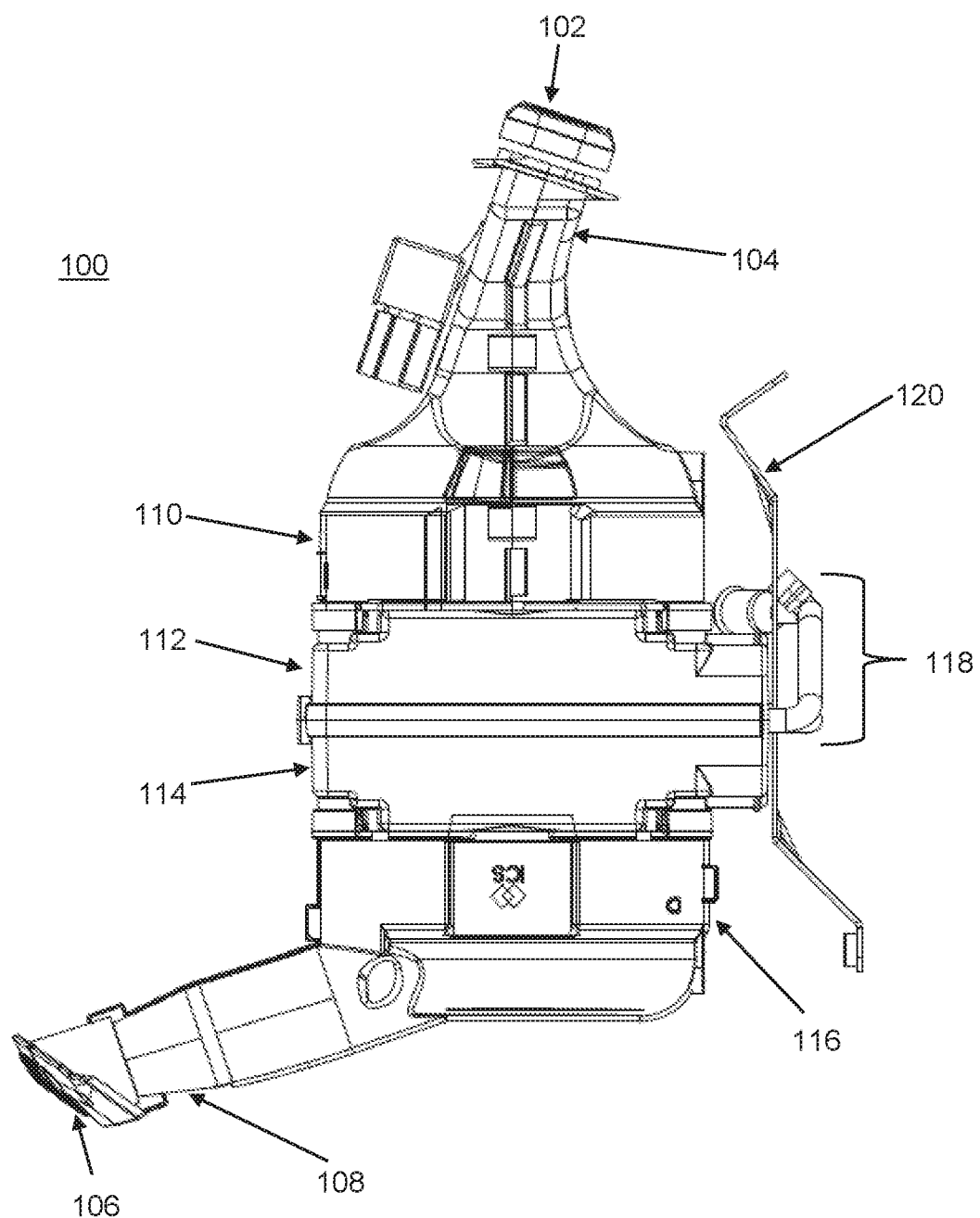
FIG. 3 is a side view of an embodiment of a dual fan design of the present disclosure.

FIGS. 1, 2 and 3 show a front view, a back view and a side view of an assembled embodiment of dual fan apparatus 100 for heating or cooling air. The orientation and view terms used herein are to provide reference for the discussion of the dual fan assembly and do not limit the disclosure. Accordingly, one skilled in the art will recognize that the dual fan apparatus 100 may be installed and/or viewed in any number of orientations and remain within the scope and spirit of the present application.

As discussed herein, the dual fan apparatus 100 is designed to facilitate heating and cooling operations and includes heating and cooling system elements. Some embodiments of the dual fan apparatus 100 are designed for only heating or cooling operations. The operation as either a heating system, cooling system or a combination system will depend on the thermal exchange component (shown in FIGS. 4 and 5) used within the dual fan apparatus 100.

The embodiment shown includes an air vent 102 attached to an air duct 104 at the top. Another air vent 106 is attached to an air duct 108 at the bottom of the dual fan apparatus 100 shown. In this embodiment, the air duct 104 is shown as part of the upper fan housing 110 and the air duct 108 is part of the lower fan housing 116. In some embodiments, the air ducts 104 and 108 may comprise a separate housing attached to the fan housings 110 and 116. In some embodiments, the air duct 104 and/or the air duct 108 may provide multiple separate air ports. In some embodiments, the air ports may be connectable to additional duct attachments which may be used to direct air to specific locations. For example, air duct 104 may include two air ports connected to flexible ducts that direct air to separate locations around the vehicle, such as one proximate to a driver seat and one proximate to a passenger seat.

In this embodiment, the dual fan apparatus 100 also includes an upper thermal exchange housing 112 and a lower thermal exchange housing 114. The upper thermal exchange housing 112 and lower thermal exchange housing 114 are designed to enclose a thermal exchange component (shown in FIGS. 4 and 5). In some embodiments, the thermal exchange housings 112 and 114 may comprise a single housing structure. In other embodiments, the upper thermal exchange housing 112 and the upper fan housing 110 may comprise a single housing and the lower thermal exchange housing 114 and the lower fan housing 116 may comprise a single housing. One skilled in the art will recognize that the housing structures may vary depending on the design requirements for an embodiment and remain within the scope of the disclosure.

In this embodiment, the upper fan housing 110, the upper thermal exchange housing 112, the lower thermal exchange housing 114 and the lower fan housing 116 are stacked along a single axis—illustrated as the vertical axis in the figures. The air duct 104 extends generally along the same vertical axis shown. In contrast, the air duct 108 extends at an angle that is nearly perpendicular from the vertical axis illustrated. Embodiments of the dual fan apparatus 100 may include air ducts 104 and 108 extending at any direction appropriate for the implementation. For example, both air ducts 104 and 108 may extend along the same axis as the main housing components. As another example, both air ducts 104 and 108 may extend at angles from the main axis in order to fit within a restricted space available for the dual fan apparatus 100.

The dual fan apparatus 100 also includes connectors 118 that are designed to connect with a heating and/or cooling fluid or gas source. For example, the connectors 118 may connect with a system pumping heated engine coolant through the thermal exchange component (shown in FIGS. 4 and 5) to operate as a heater. The system may be operable to reverse the flow of the coolant to pump cold coolant through the thermal exchange component to operate as an air conditioner. One skilled in the art will recognize that the type of fluid or gas may vary depending on the operational characteristics of the thermal exchange component and the dual fan apparatus 100. The term thermal agent is used herein to identify the fluid or gas used in the thermal exchange component 142.

The dual fan apparatus 100 also includes a mounting bracket 120 in this embodiment. As shown in FIGS. 2 and 3 the mounting bracket 120 is provided at the back of the dual fan apparatus 100 and may include features—such as the angular elements illustrated in FIG. 3—designed for specific mounting conditions. One skilled in the art will recognize that the placement and features of the mounting bracket 120 may vary to accommodate structural restrictions of the vehicle or other component in which the dual fan apparatus 100 is installed and remain within the scope and spirit of the disclosure. In some embodiments, the mounting bracket 120 is attached directly to one or more of the housing components 110, 112, 114 and 116. In some embodiments, the mounting bracket 120 may be attached directly to one of the internal components of the dual fan apparatus 100. In some embodiments, the mounting bracket 120 may incorporate adjustable features or attachments to allow one version of the dual fan apparatus 100 to be operable in a variety of enclosed spaces with different mounting characteristics. For example, the angles in the mounting bracket 120 shown in FIG. 3 may be adjustable to allow variable mounting angles. For another example, the mounting bracket 120 may include spacers to provide installation adjustments.

Figure 4:
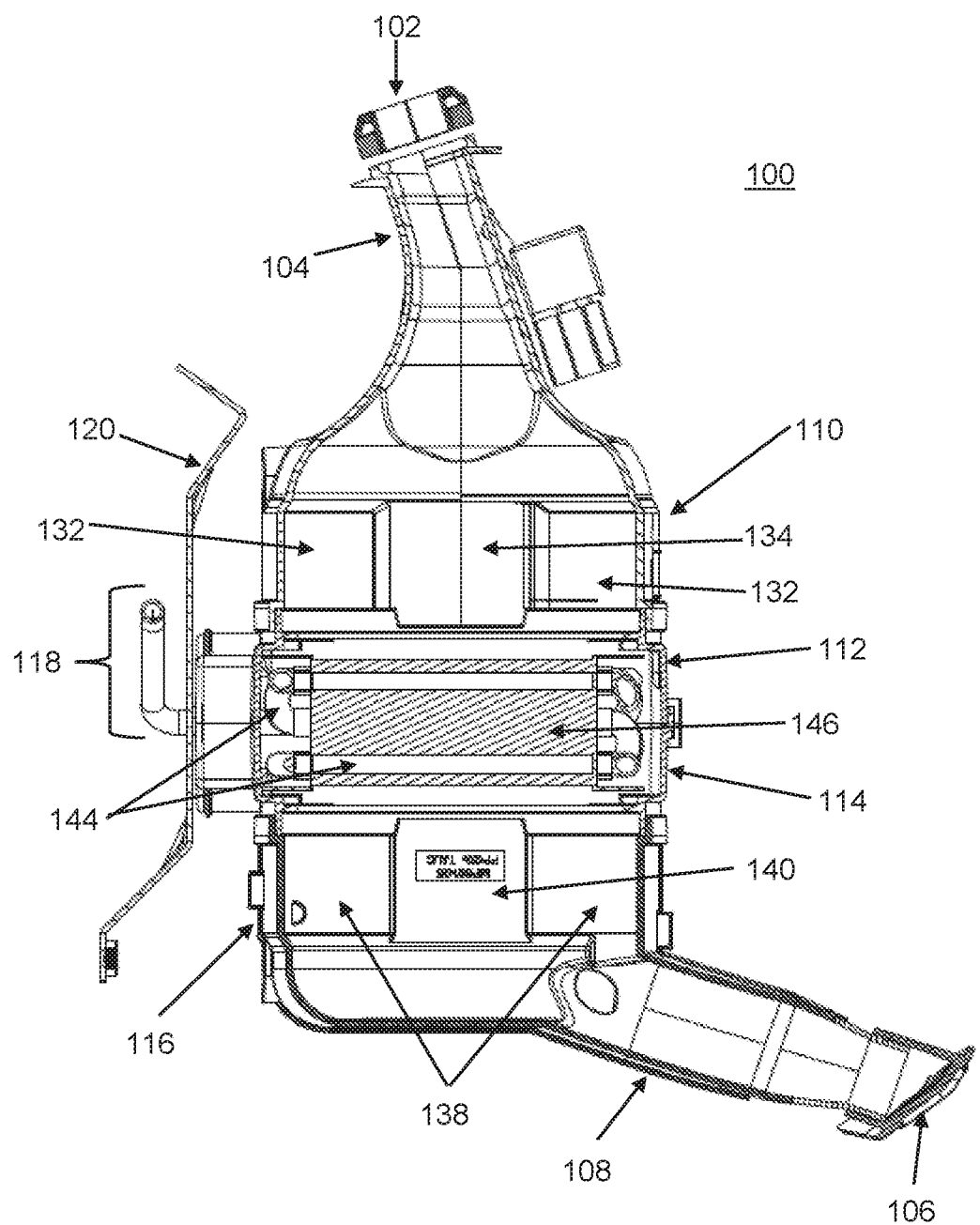
FIG. 4 is a cross-section side view of an embodiment of a dual fan design of the present disclosure.

FIG. 4 illustrates a cross-section view of the dual fan apparatus 100. As discussed above, the embodiment shown includes the upper fan housing 110, the upper thermal exchange housing 112, the lower thermal exchange housing 114 and the lower fan housing 116. The upper fan housing 110 includes the air duct 104 with the vent 102 attached thereto. The lower fan housing 116 includes the air duct 108 with the vent 106 attached thereto.

Figure 5:
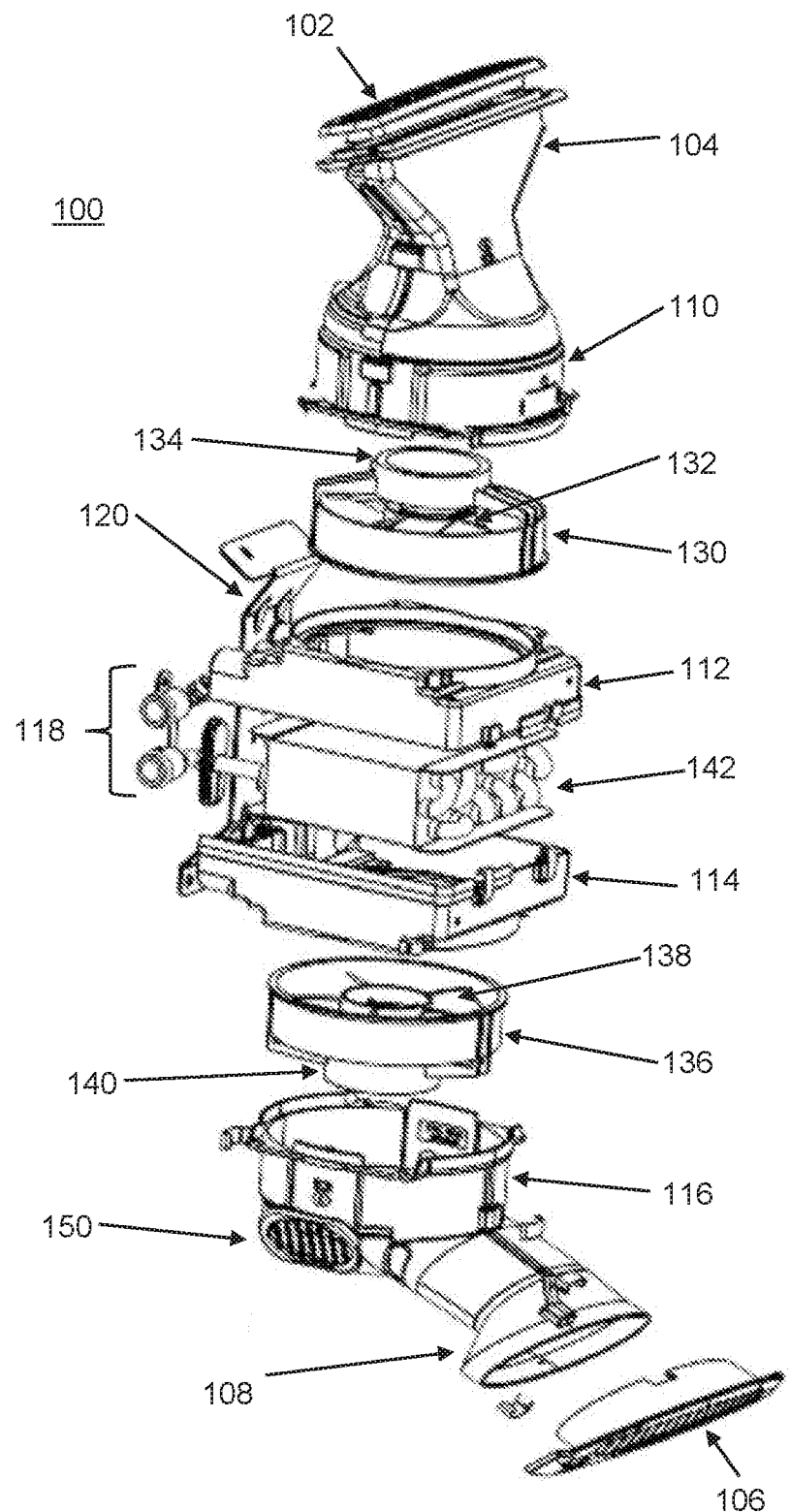
FIG. 5 is a perspective, exploded view of an embodiment of a dual fan design of the present disclosure.

The dual fan apparatus 100 includes an upper fan 130 and a lower fan 136 (shown in FIG. 5). The upper fan 130 includes fan blades 132 and fan motor 134 operable to turn the fan blades 132 in forward and reverse directions. The lower fan 136 includes fan blades 138 and fan motor 140 operable to turn the fan blades 138 in forward and reverse directions. The fan motors 134 and 140 are located in the center of the upper fan 130 and lower fan 136 respectively and each attach to the respective fan blades 132 and 138. The fan blades 132 and 138 are designed to rotate around the central fan motors 134 and 140. In some embodiments, the fan blades 132 and 138 are designed to include a central mounting socket attachable to a mounting rod extending from the fan motors 134 and 140. In some embodiments, the fan motor 134 and/or 140 may be extended along the vertical axis from the fan blades 132 and/or 138.

In this embodiment, the fans 130 and 136 are located in line with the thermal exchange component 142 (shown in FIG. 5). Axial fans using a central motor as illustrated in this embodiment facilitate the in line configuration with other components. The use of axial fans also allows the diameter of the fans 130 and 136 to extend to the edge of the interior edge of the dual fan apparatus 100 and correspond with the size of the thermal exchange component 142. In turn, the corresponding sizes between the fan and the thermal exchange component 142 maximize the airflow over the thermal exchange component 142. Accordingly, the in line configuration of the axial fans 130 and 136 and the thermal exchange component 142 allows the dual fan apparatus 100 to maintain a compact design with a high effective airflow across the thermal exchange component 142.

The thermal exchange component 142 may be a heating element (such as a heat exchanger, electric coil, heater core, etc.), a cooling element (such as an air conditioner evaporator) or a combination component comprising a heating element and a cooling element. The thermal exchange component 142 illustrated includes tubes 144 through which the thermal agent (i.e., heating and/or cooling fluid or gas) flows and fins 146 designed to increase the surface area for facilitating the thermal exchange from the thermal agent in tubes 144 to the air passing over the thermal exchange component 142. The increased surface area provided by the fins 146 increases the efficiency of the thermal transfer into the air. In some embodiments, multiple thermal exchange components 142 may be included in the dual fan apparatus 100.

FIG. 5 illustrates an exploded view of an embodiment of the dual fan apparatus 100. This view shows the various components that are assembled in to the dual fan apparatus 100. As discussed above, the dual fan apparatus 100 includes the vent 102 attached to the air duct 104 of the upper fan housing 110. One end of the upper fan housing 110 fits over the upper fan 130 when assembled. In some embodiments, the upper fan 130 is mounted to the upper fan housing 110. The upper fan 130 includes the fan motor 134 with fan blades 132 designed to rotate in either a forward or reverse direction around the fan motor 134. The upper fan 130 fits over the thermal exchange component 142 when assembled. In some embodiments, the upper fan 130 and/or the lower fan 136 are substantially parallel with the thermal exchange component 142. The fans 130 and 136 may be substantially parallel to ensure the majority of air is pushed directly onto the thermal exchange component 142 or pulled directly from the thermal exchange component 142.

The thermal exchange component 142 is enclosed within the upper thermal exchange housing 112 and the lower thermal exchange housing 114. The upper thermal exchange housing 112 includes an opening in the top to correspond with the upper fan 130. In some embodiments, the upper fan 130 may be mounted to the opening in the upper thermal exchange housing 112. The lower thermal exchange housing 114 includes an opening in the bottom to correspond with the lower fan 136. In some embodiments, the lower fan 136 may be mounted to the opening in the lower thermal exchange housing 114.

The thermal exchange component 142 also includes input/output tubes that terminate at connectors 118. The connectors 118 are designed to operably connect the thermal exchange component 142 to a system for heating and/or cooling a fluid or gas medium used by the thermal exchange component 142. The input/output tubes pass through an opening in the back of the dual fan apparatus 100 between the upper thermal exchange housing 112 and the lower thermal exchange housing 114.

In this embodiment, the mounting bracket 120 is attached to the back of the dual fan apparatus 100. The mounting bracket 120 may be attached to the thermal exchange housing components 112 and 114 in some embodiments. In other embodiments, the mounting bracket 120 may be attached to the thermal exchange component 142. In yet other embodiments, the mounting bracket 120 may be attached to a combination of components of the dual fan apparatus 100. For example, the mounting bracket 120 may be attached to the upper fan housing 110, the thermal exchange component 142 and the lower fan housing 116. One skilled in the art will recognize that the mounting bracket 120 may be attached to any of the components of the dual fan apparatus 100. In addition, some embodiments may include multiple mounting brackets 120 attached at different locations on the dual fan apparatus 120. The location, design and structure of the mounting brackets 120 may vary dependent upon the installation requirements. In some embodiment, a product package may include multiple mounting brackets 120 in order for a single product package to be applicable to multiple applications for installation.

The lower fan 136 includes the fan motor 140 with fan blades 138 designed to rotate in either a forward or reverse direction around the fan motor 140. The lower fan 136 fits under the thermal exchange component 142 when assembled. In some embodiments, the lower fan 136 is mounted to the lower fan housing 116 which fits over the lower fan 136 when the dual fan apparatus 100 is assembled. The lower fan housing 116 includes the air duct 108 extending at a near perpendicular angle from the main axis of the dual fan apparatus 100. The air port at the end of air duct 108 attaches to vent 106. In this embodiment, the lower fan housing 116 also includes a second air port with a vent 150 provided in the air port. This air port provides a separate air intake or exit from the lower fan housing 116.

Vent 106 is designed to fit with the air port at the end of the air duct 108. One skilled in the art will recognize that the vents are designed to fit with the respective air ports and may connect to the air port in a variety of manners. For example, the vent 106 may be configured to fit within the air port of duct 108 such that the vent 106 and air port create a friction connection between the components. The components may include alternative connection means to facilitate a fixed connection between the vent and the air port. For example, the components may be connected using adhesives, bolts, screws, clamps, latches and/or other connections. In some embodiments, the vents may be molded into or welded to the air ports.

The vents 102, 106 and 150 are designed to facilitate the airflow into and out of the dual fan apparatus 100. In some embodiments, the vents 102, 106 and 150 may be adjustable to allow a user to control the direction of the airflow. For example, the vents 102, 106 and 150 may include a control to direct the output of air towards the user. In some embodiments, some vents may be adjustable while other vents are not. For example, vent 102 may be adjustable while vents 106 and 150 are not adjustable. Some embodiments of the vents 102, 106 and 150 may prevent total occlusion of the associated air port.

When assembled, the external housing components 110, 112, 114 and 116 will be connected to form an apparatus housing that encases the internal components including the upper fan 130, thermal exchange component 142 and lower fan 136. The interior structure of the housing components 110, 112, 114 and 116 will be designed to hold the upper fan 130, thermal exchange component 142 and lower fan 136 in an operational configuration with the upper fan 130 and lower fan 136 located adjacent to opposite sides of the thermal exchange component 142. In some embodiments, the internal components may be held in place by pressures applied by the assembled external housing components. In alternative embodiments, the internal components may be attached to the external housing components though a fixed connection. For example, the upper fan 130 may be attached to the upper thermal exchange housing 112 by an adhesive connection and bolts. For another example, the lower fan 136 may be attached to the lower fan housing 116 by a snap connection.

In some embodiments, the connections between components and/or the mounting bracket 120 and the vehicle may incorporate gaskets or other paddings to limit vibration caused during operation of the dual fan apparatus 100 and/or the vehicle in which the dual fan apparatus 100 is installed.

In advance of operation, the dual fan apparatus 100 is installed in a vehicle or other environment. The dual fan apparatus 100 may be rotated in order to fit in a vehicle or other environment during installation. For example, vent 102 may be placed in a dashboard of a vehicle to operate as an upper air vent and the vent 106 may be designed to operate as a lower air vent for the feet. In another embodiment, the dual fan apparatus may be rotated such that the vent 102 may operate as a lower air vent for the feet and the vent 106 may operate as a defrost vent in the top of a vehicle dashboard. As discussed above, some embodiments may include additional air ports and air ducts to facilitate additional vent locations in a vehicle.

Once properly rotated and positioned, the dual fan apparatus 100 may be installed using one or more mounting brackets 120. In some embodiments, additional connection points between the dual fan apparatus 100 and the vehicle or other environment may be used during installation. For example, during installation in a vehicle, the air ports on air ducts 104 and 108 may abut openings in the vehicle dashboard and/or body, and the vents 102 and 106 may pass through the openings in the dashboard and/or body to engage and connect to air ducts 104 and 108 creating additional connections between the dual fan apparatus 100 and the vehicle.

Finally, a thermal modification system (i.e., a heating and/or cooling system) that circulates a thermal agent (i.e. a gas or fluid) is attached to the connections 118 of the thermal exchange component 142. One of the connections 118 operates as an input while the second connection 118 operates as an output to continue the circulation of the thermal agent through the external thermal modification system and back to the thermal exchange component 142. For example, a heated engine coolant may be circulated through a heating system whereby the heat from the engine coolant is transferred into the air via the thermal exchange component 142.

During operation of a combination heating and cooling apparatus, the external heating and cooling system will circulate a fluid or gas through the thermal exchange component 142 in a first direction. For example, the external heating and cooling system may pump heated engine coolant into the top connection 118 and through the thermal exchange component 142. While the heated engine coolant is passing through the tubes 144 of the thermal exchange component 142, the heat from the engine coolant transfers into cooler air passing through the thermal exchange component 142. Specifically, the heat transfer occurs from the engine coolant through the conductive material of the tubes 144 and the fins 146 attached to the tubes 144 into the passing air. The surface area of the fins 146 operates to increase the efficiency of the heat exchange. The transfer of heat into the air causes the engine coolant to reduce in temperature within the thermal exchange component 142. Accordingly, the coolant exits the thermal exchange component 142 and the lower connection 118 at a reduced temperature and continues to circulate through the external heating and cooling system wherein the fluid or gas becomes reheated and returns to the thermal exchange component 142. In some embodiments, the external heating aspect of the system may operate in different manners that pump heated gas or fluid through the thermal exchange component.

While the heated engine coolant is passing through the thermal exchange component 142, the upper fan 130 and lower fan 136 operate in conjunction to move air through the dual fan apparatus 100 and the thermal exchange component 142 in one direction. For example, the upper fan 130 may rotate blades 132 in a clockwise direction to pull air through the thermal exchange component 142 and push the air out of air duct 104 and vent 102 while the lower fan 136 may rotate blades 138 in a counter-clockwise direction to push air into the thermal exchange component 142 and pull air into the dual fan apparatus 100 through vent 150 and/or vent 106 via the air duct 108. The fan motors 134 and 140 may be reversed to move air through the dual fan apparatus 100 in the opposite direction. In some embodiment, the angle of the blades 132 or 138 may be reversed such that both fans 130 and 136 rotate in the same direction to move air through the dual fan apparatus 100 in the same direction.

The push-pull operation of the two fans 130 and 136 operates to improve the air speed through the dual fan apparatus 100 and the thermal transfer into the air. For example, when the air is moved through the dual fan apparatus 100 in the direction from vent 102 to vents 150 and/or 106, the fan 130 may push air into the area of the thermal exchange component 142 and the fan 136 may pull air from the area of the thermal exchange component 142. When operating to push the air, the design of the fan blades 132 may push more of the air to the edges of the fan 130. In contrast, the design of fan blades 138 may draw more air through the center of fan 136 when operating to pull the air from the thermal exchange component 142. In such an embodiment, the push-pull effects caused by the fans 130 and 136 cause more air to pass from the outer edges to the center of the thermal exchange component 142 increasing the efficiency of the thermal transfer. In contrast to the airflow created by the dual fan apparatus 100, a single fan would not operate to provide the uniform airflow across the entirety of a heat exchange.

When the dual fan apparatus 100 is used as part of a cooling system, the direction of the fluid or gas passing through the tubes 144 of the thermal exchange component 142 may be reversed. Accordingly, the cooled fluid or gas may be pumped from a compressor into the lower connection 118 into the thermal exchange component 142. The thermal exchange component 142 may act as an evaporator to cool the air passing through the dual fan apparatus 100. The fluid or gas may exit the thermal exchange component 142 at an increased temperature and continue to circulate through the external cooling system elements until returning to the thermal exchange component 142.

In some embodiments, the external heating system and external cooling system are integrated such that the direction in which the gas or fluid passes dictates whether the thermal exchange component 142 operates as a heating or cooling exchange. In some embodiments, the external heating system and external cooling system are separate systems tied into tubing connected to the connections 118 at a controlled junction. The junction operates to control whether the heating system or cooling system is actively associated with the dual fan apparatus 100. In some embodiments, the external heating and/or cooling system may operate utilizing gas-to-fluid and fluid-to-gas transitions to create the thermal differences used in the thermal exchange component 142.

Embodiments of the dual fan apparatus 100 include an operably associated user interface to control the operation of the dual fan apparatus 100. For example, the user interface allows a user to control the direction of airflow, speed of the airflow and/or temperature of the airflow. The user interface may include electronic and/or mechanical switches.

During operation, the vents 102, 150 and/or 106 may be controlled by a user to direct airflow into and/or out of the dual fan apparatus 100. For example, a user may tilt the vent 102 to direct heated air toward a user's legs during cold weather. A user may later angle the vent 106 to direct cooled air in the center of a vehicle cabin. In some embodiments, the functions of the dual fan apparatus 100 may affect the operation of the vents 102, 106 and 150. For example, the vents 106 and 150 may be open as the air is directed out vent 102 to maintain maximum airflow into the dual fan apparatus 100. When the airflow is reversed, the vent 150 may automatically close in order to direct the maximum airflow out of vent 106. In some embodiments, the vents 102, 106 and/or 150 may include elements to prevent occlusion of the vent and ensure airflow into the dual fan apparatus 100 is not cut off. In some embodiments, additional air ports may be built into the dual fan apparatus 100 to ensure the availability of air on the intake side of the dual fan apparatus 100.

Figure 6:
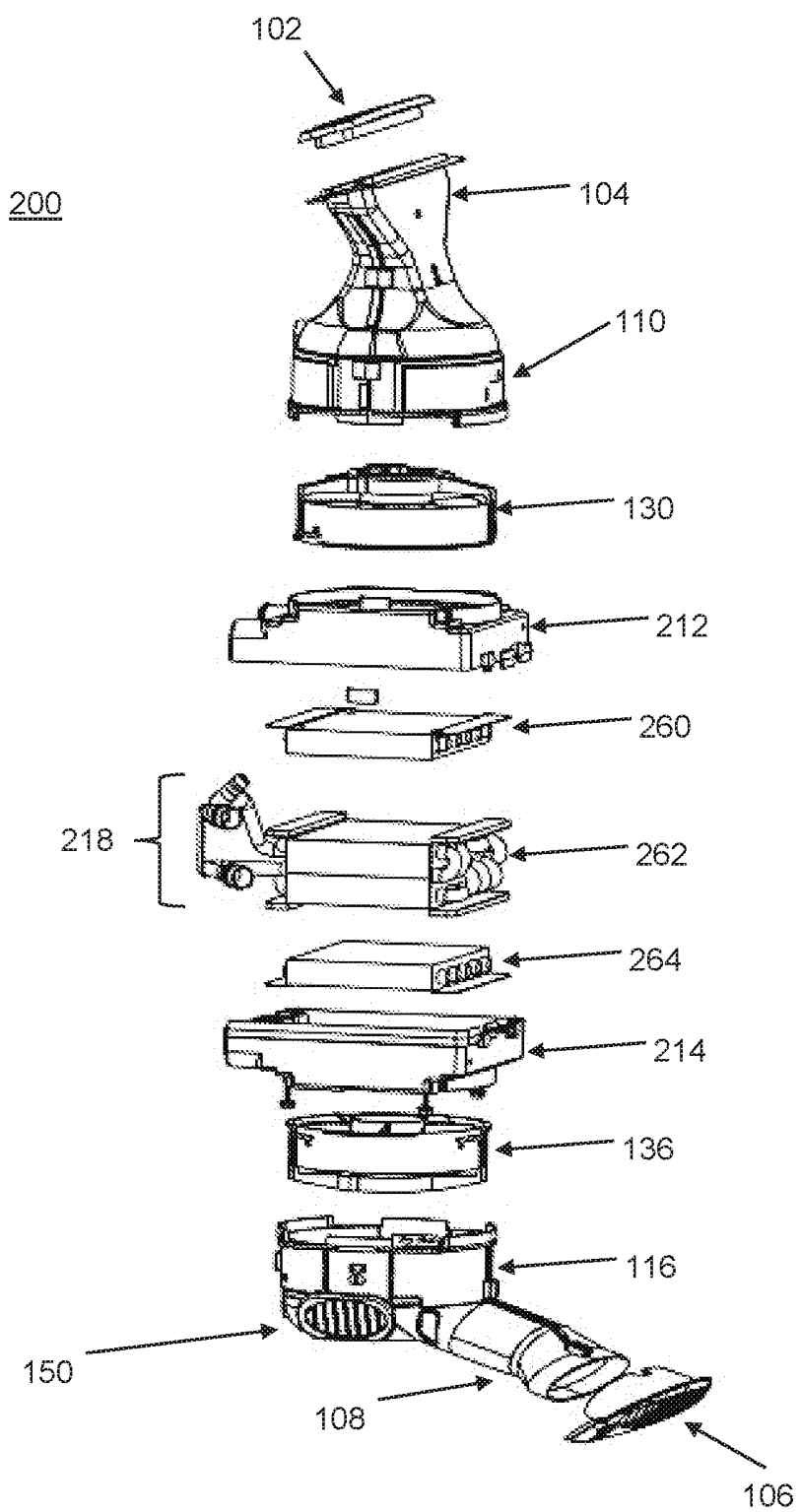
FIG. 6 is a perspective, exploded view of another embodiment of a dual fan design of the present disclosure.

FIG. 6 illustrates an exploded view of another embodiment of a dual fan apparatus 200. This view shows the various components that are assembled in the dual fan apparatus 200. Although the housing components and the fans are similar to the design disclosed above, this embodiment illustrates an alternative configuration of the thermal exchange system. As discussed further below, the thermal exchange component 142 described above is replaced with the series of thermal exchange components 260, 262 and 264 in the embodiment shown in FIG. 6.

Similar to the embodiment discussed above, the dual fan apparatus 200 includes the vent 102 attached to the air duct 104 of the upper fan housing 110. One end of the upper fan housing 110 fits over the upper fan 130 when assembled. The upper fan 130 is designed to rotate in either a forward or reverse direction. The lower fan 136 is also designed to rotate in either a forward or reverse direction. The lower fan housing 116 which fits over the lower fan 136 when the dual fan apparatus 200 is assembled. The lower fan housing 116 includes the air duct 108 extending at a near perpendicular angle from the main axis of the dual fan apparatus 200. The air port at the end of air duct 108 attaches to vent 106. In this embodiment, the lower fan housing 116 also includes a second air port with a vent 150 provided in the air port. This air port provides a separate air intake or exit from the lower fan housing 116.

The vents 102, 106 and 150 are designed to facilitate the airflow into and out of the dual fan apparatus 200. In some embodiments, the vents 102, 106 and 150 may be adjustable to allow a user to control the direction of the airflow. For example, the vents 102, 106 and 150 may include a control to direct the output of air towards the user. Some embodiments of the vents 102, 106 and 150 may prevent total occlusion of the associated air port.

The thermal exchange components in this embodiment include upper heater core 260, evaporator 262 and lower heater core 264. The upper and lower heater cores 260 and 264 are designed to heat the air passing through the dual fan apparatus 200. The heater cores 260 and 264 may be an engine coolant heat exchange unit, an electric heat exchange unit or any other type of heating element. In addition, the upper heater core 260 and the lower heater core 264 may be the same type of heating element or may be different types of heating elements. The evaporator 262 in this embodiment operates as a cooling element and cools air passing through the evaporator 262. In some embodiments, the evaporator 262 may be replaced with an alternative cooling element or device. In some embodiments, the thermal exchange components—i.e. the upper heater core 260, the evaporator 262 and the lower heater core 264—are slim frame designs to minimize the necessary space for the components.

The thermal exchange components—i.e. the upper heater core 260, the evaporator 262 and the lower heater core 264—are enclosed within the upper thermal exchange housing 212 and the lower thermal exchange housing 214. The upper thermal exchange housing 212 includes an opening in the top to correspond with the upper fan 130. The lower thermal exchange housing 214 includes an opening in the bottom to correspond with the lower fan 136.

In this embodiment, the evaporator 262 also includes input/output tubes that terminate at connectors 218. The connectors 218 are designed to operably connect the evaporator 262 to a system for cooling a fluid or gas medium used by the evaporator 262. The input/output tubes pass through an opening in the back of the dual fan apparatus 200 between the upper thermal exchange housing 212 and the lower thermal exchange housing 214.

In this embodiment, one or more housing components of the dual fan apparatus 200 are designed to facilitate mounting of the dual fan apparatus 200 in a vehicle or another limited space environment. As discussed above, one or more mounting brackets may be attached to the dual fan apparatus 200 to coordinate specific mounting configurations.

When assembled, the upper fan 130 fits over the upper heater core 260 and the lower fan 136 fits under the lower heater core 264. In some embodiments, the upper fan 130 and/or the lower fan 136 are substantially parallel with the upper heater core 260, the evaporator 262 and/or the lower heater core 264. The fans 130 and 136 may be substantially parallel to ensure the majority of air is pushed directly onto the thermal exchange components 260, 262 and 264 or pulled directly from the thermal exchange components 260, 262 and 264.

When assembled, the external housing components 110, 212, 214 and 116 will be connected to form an apparatus housing that encases the internal components including the upper fan 130, the upper heater core 260, the evaporator 262, the lower heater core 264 and the lower fan 136. The interior structure of the housing components 110, 212, 214 and 116 will be designed to hold the upper fan 130, the upper heater core 260, the evaporator 262, the lower heater core 264 and the lower fan 136 in an operational configuration. The upper and lower heater cores 260 and 264 are designed to sandwich the evaporator 262 in line with the upper and lower fans 130 and 136 which are located on opposite sides of the sandwiched thermal exchange components. Accordingly, the configuration of housing components 110, 212, 214 and 116 will hold the upper fan 130 adjacent to the upper heater core 260 and lower fan 136 adjacent to the lower heater core 264 on opposite sides of the sandwiched thermal exchange components. In some embodiments, the internal components may be held in place by pressures applied by the assembled external housing components 110, 212, 214 and 116. In alternative embodiments, the internal components may be attached to the external housing components though a fixed connection.

In advance of operation, the dual fan apparatus 200 is installed in a vehicle or other environment. The dual fan apparatus 200 may be rotated in order to fit in a vehicle or other environment during installation. As discussed above, some embodiments may include additional air ports and air ducts to facilitate additional vent locations in a vehicle. Once properly rotated and positioned, the dual fan apparatus 200 may be installed using one or more mounting components. Finally, a cooling system that circulates a thermal agent (i.e. a gas or fluid) is attached to the connections 218 of the evaporator 262. One of the connections 218 operates as an input while the second connection 218 operates as an output to continue the circulation of the thermal agent through the cooling system and back to the evaporator 262.

During operation of the dual fan apparatus 200 for heating, either one or both of the upper heater core 260 and the lower heater core 264 may be engaged to heat the air passing through the dual fan apparatus. For example, only the upper heater core 260 may be on when air is moving through the dual fan apparatus 200 in an upward direction. Alternatively, only the lower heater core 264 may be on when air is moving through the dual fan apparatus 200 in a downward direction. In some embodiments, both heater cores 260 and 264 may be engaged to increase the air temperature more than either heater core 260 or 264 can heat the air alone.

During operation of the dual fan apparatus 200 with the evaporator 262 engaged, the external cooling system will circulate a fluid or gas through the evaporator 262. Cooled fluid or gas may be pumped from a compressor into the input connection 218 into the evaporator 262 to cool the air passing through the dual fan apparatus 200. The fluid or gas may exit the evaporator 262 at an increased temperature and continue to circulate through the external cooling system elements until returning to the evaporator 262. When the evaporator 262 is engaged, the air is conditioned and cooled as it passes through the evaporator 262. In some embodiments, the evaporator 262 may be engaged when the dual fan apparatus 200 is used for cooling and/or heating air. In some embodiments, the evaporator 262 may be used for cooling and heating the air up to a threshold temperature at which the evaporator 262 is shut off to facilitate increased heating of the air.

During operation of the dual fan apparatus 200, the operation of each of the upper heater core 260, the evaporator 262 and the lower heater core 264 is coordinated to provide desired air conditioning and thermal modification. For example, when the air is moving from the air duct 104 towards the air duct 108, the upper heater core 260 may be turned off while the evaporator 262 and the lower heater core 264 are engaged to condition the air and heat the outgoing air. For another example, the evaporator 262 may be shut off while both heater cores 260 and 264 are engaged to facilitate an increased air temperature flowing through the dual fan apparatus 200. In addition, one or more of the thermal exchange components 260, 262 and 264 may include an independent adjustment to modify the thermal output through the component.

While the dual fan apparatus 200 is operating, the upper fan 130 and lower fan 136 operate in conjunction to move air through the dual fan apparatus 200 and the thermal exchange components 260, 262 and 264 in one direction. For example, the upper fan 130 may rotate blades in a clockwise direction to pull air through the thermal exchange components 260, 262 and 264 and push the air out of air duct 104 and vent 102 while the lower fan 136 may rotate blades in a counter-clockwise direction to push air into the thermal exchange components 260, 262 and 264 and pull air into the dual fan apparatus 200 through vent 150 and/or vent 106 via the air duct 108. The fan motors may be reversed to move air through the dual fan apparatus 200 in the opposite direction.

The push-pull operation of the two fans 130 and 136 operates to improve the air speed through the dual fan apparatus 200 and the thermal transfer into the air. For example, when the air is moved through the dual fan apparatus 200 in the direction from vent 102 to vents 150 and/or 106, the fan 130 may push air into the area of the thermal exchange components 260, 262 and 264 and the fan 136 may pull air from the area of the thermal exchange components 260, 262 and 264.

Embodiments of the dual fan apparatus 200 include an operably associated user interface to control the operation of the dual fan apparatus 200. For example, the user interface allows a user to control the direction of airflow, speed of the airflow and/or temperature of the airflow. The user interface may include electronic and/or mechanical switches. For example, the user interface may control a water valve to modify the temperature output.

Figure 7:
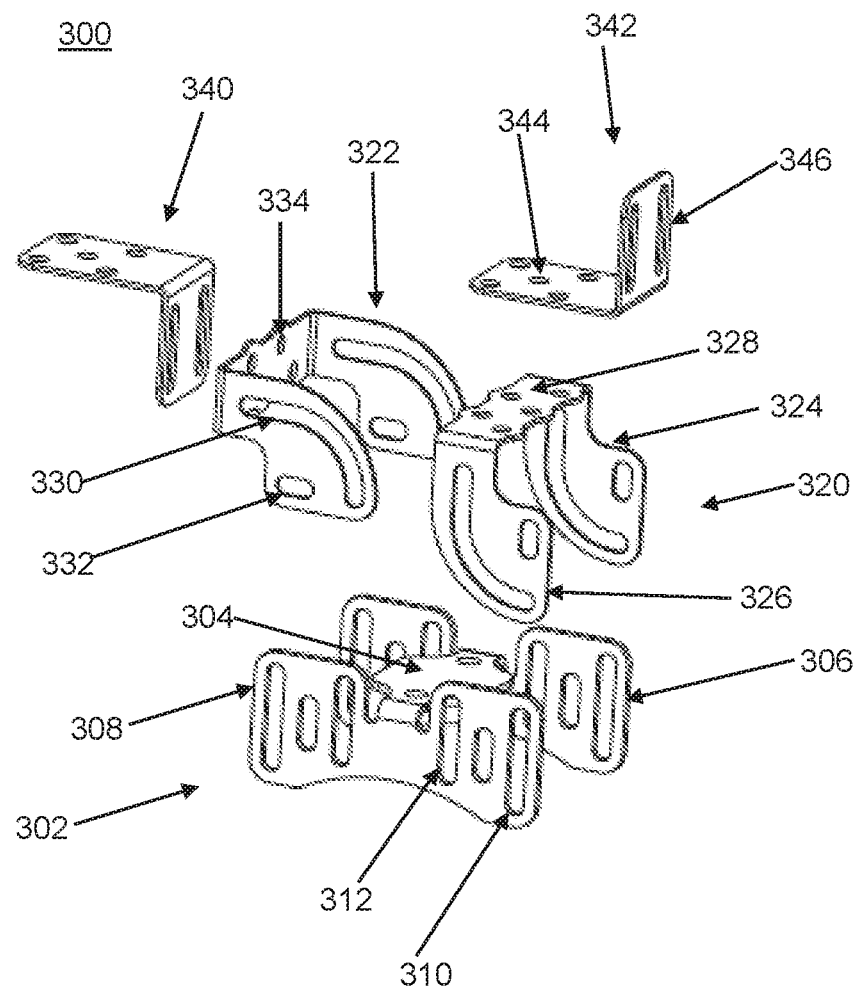
FIG. 7 is a perspective, exploded view of an embodiment of a flexible bracket design of the present disclosure.
Figure 8:
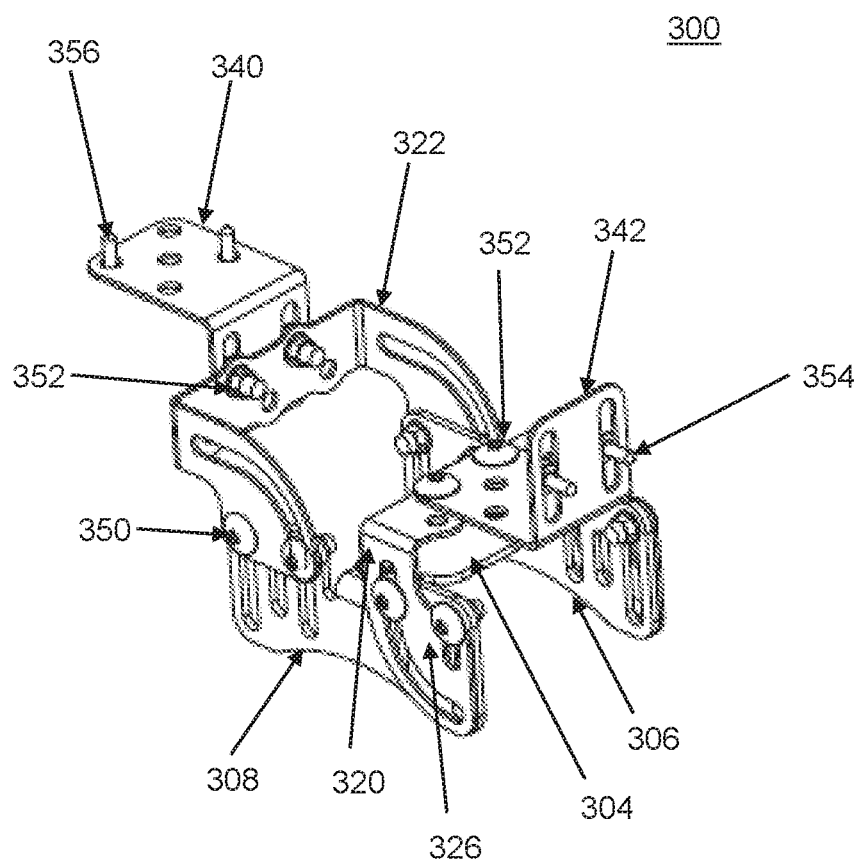
FIG. 8 is a perspective, assembled view of an embodiment of a flexible bracket design of the present disclosure.

FIGS. 7 and 8 illustrate an embodiment of a flexible bracket system 300 in a first configuration. FIG. 7 shows the flexible bracket system 300 in an exploded view and FIG. 8 shows the flexible bracket system 300 in an assembled view. The flexible bracket system 300 may be attached to the dual fan apparatuses discussed herein instead of or in conjunction with the bracket 120 discussed above. In addition, the flexible bracket system 300 may be attached to alternative air modification devices, such as heaters, air conditioning units, fans and/or other devices that change one or more characteristics of the air. The orientation and view terms used herein are to provide reference for the discussion of the components discussed herein and do not limit the disclosure. Accordingly, one skilled in the art will recognize that the components may be installed and/or viewed in any number of orientations and remain within the scope and spirit of the present application.

Flexible bracket system 300 includes a center bracket 302, a first actuating bracket 320, a second actuating bracket 322, a first angled bracket 340 and a second angled bracket 342. These components are shown in a first configuration; however, the components may be rearranged, reoriented and/or replaced to facilitate multiple configurations of the flexible bracket system 300.

The center bracket 302 includes a mounting plate 304 extending between a first wing 306 and a second wing 308. The mounting plate 304 is dimensioned to fit against a mounting section of an air modification device, such as the dual fan apparatus discussed herein. The first and second wings 306 and 308 are adapted to place the bottom of the wing against or in close proximity to the air modification device body. In addition, the first and second wings 306 and 308 are adapted to extend the width of the center bracket 302 on both sides of the mounting bracket 304. In some embodiments, the first and second wings 306 and 308 are approximately perpendicular to the mounting bracket 304. Each side of the first and second wings 306 and 308 include a series of openings, including first opening 310 and second opening 312. The first and second openings 310 and 312 are oblong in shape to allow adjustment between connected pieces.

The first actuating bracket 320 and the second actuating bracket 322 shown in this embodiment are the same structure in different orientations. Both the first and second actuating brackets 320 and 322 include curved sides 324 and 326 connected by a center plate 328. In this embodiment, each side includes a curved opening 330 and an oblong opening 332. The design of the openings 330 and 332 allow the actuating brackets 320 and 322 to rotate and adjust positions in some embodiments. For example, the actuating brackets 320 and 322 may rotate throughout the arc provided by the curved openings 330. Each center plate includes a series of holes 334 to facilitate attachment to other bracket components and/or installation. For example, in some embodiments, one or more holes 334 in the center plate 328 may correspond to installation points within a vehicle housing and facilitate mounting the air modification apparatus in the vehicle.

The angled bracket components 340 and 342 shown in this embodiment also illustrate the same structure shown in different orientations. Both angled brackets 340 and 342 include a pattern of holes 344 on one leg of the bracket component and oblong openings 346 on the second leg of the bracket component. In some embodiments, the number and pattern of holes 344 allows for variation in attachment options based upon a selection of the holes 344. In such embodiments, the holes 344 may not allow significant adjustment or any adjustment depending on the connection. The oblong openings 346 allow adjustment along the length of the oblong holes 346 which may facilitate sliding adjustments, rotational adjustments and/or other adjustments based upon the connections used with the oblong openings 346.

In the assembled configuration, the first and second actuating brackets 320 and 322 are attached to the first and second wings 306 and 308 of the center bracket 302. Connectors (shown as bolts 350) connect the center bracket opening 310 with the actuating bracket oblong opening 332 and the center bracket opening 312 with the actuating bracket curved opening 330. When loosely connected, the actuating brackets 320 and 322 may be rotated approximately 90 degrees wherein the actuating bracket center plate 328 may rotate from a horizontal position similar to the center bracket mounting plate 304—see actuating bracket 320—to a vertical position—see actuating bracket 322. In some embodiments, the connectors 350 may be tightened to fix the actuating brackets 320 and 322 in any set rotational orientation between the minimum position—approximately horizontal—and the maximum position—approximately vertical. Embodiments may modify the openings to allow alternative rotational options such as 120 degrees of rotation, 60 degrees of rotation, 45 degrees of rotation, etc. In the embodiment shown, the actuating brackets 320 and 322 are operable to rotate from the position of actuating bracket 320 upward to the position of actuating bracket 322. In some embodiments, one or more of the actuating brackets 320 and 322 may be inverted in relation to the center bracket 302 whereby the actuating bracket may rotate downward increasing the range of potential attachment locations.

In the embodiment shown, the actuating brackets 320 and 322 are attached to the angled brackets 342 and 340 respectively by connectors (shown as bolts 352). The bolts 352 connect the pattern of holes 344 in the second angled bracket 342 with the holes 328 of the first actuating bracket 320. In this embodiment, the bolts 352 are dimensioned to fit the holes 344 and 328 and when engaged through the holes 344 and 328 the first angled bracket 342 is not adjustable in relation to the first actuating bracket 320.

In contrast, the oblong openings 346 of the first angled bracket 340 are used to connect with the holes 334 of the second actuating bracket 322. In this embodiment, the oblong openings 346 allow the first angled bracket 340 to adjust in relation to the holes 334 of the second actuating bracket 322 when the bolts 352 are engaged but sufficiently loose to allow movement between the components. For example, the first angled bracket 340 may slide vertically along the oblong openings 346 to adjust the height. For another example, the first angled bracket 340 may rotate wherein a bolt 352 slides down one of the oblong openings 346 while another bolt 352 slides up the second oblong opening 346.

This embodiment also shows connectors (shown as bolts 354 and 356) for attaching the flexible bracket 300 to the installation device. For example, the bolts 354 and 356 may attach to one or more frame components of a vehicle for installing the device in a vehicle. Although connectors have been shown and described as bolts 350, 352, 354 and 356, the various connectors may be alternative components to facilitate connections such as screws, pins, friction components and/or other components. In addition, alternative connections may be implemented instead of separate connectors—such as adhesives, welds, rivets and other connections. One skilled in the art will recognize that the connections may be created using removable connection options (i.e. options that facilitate the option to remove, modify or otherwise regularly manipulate the connection option), semi-permanent connection options (i.e. options that are not intended to be disconnected, but allow for disconnection without damaging the integrity of the components) or permanent connection options (i.e. options that are not intended to be disconnected and are likely to damage the integrity of the components if steps are taken to disconnect the components). One skilled in the art will recognize that one or more types of connections may be implemented in the flexible bracket system 300.

In light of the application, one skilled in the art will also recognize that that the configurations of the holes and other openings used for connecting components together and/or to an installation may vary and remain within the scope and spirit of the present disclosure. In some embodiments of flexible bracket system 300 may include additional options for the bracket components having different connection attributes. For example, an extension component having a generally rectangular shape with holes at each end that facilitates extending the length of a connection. For another example, alternative angled brackets having different angles between the legs, such as 45 degree angles, 60 degree angles, 120 degree angles, etc.

Figure 9:
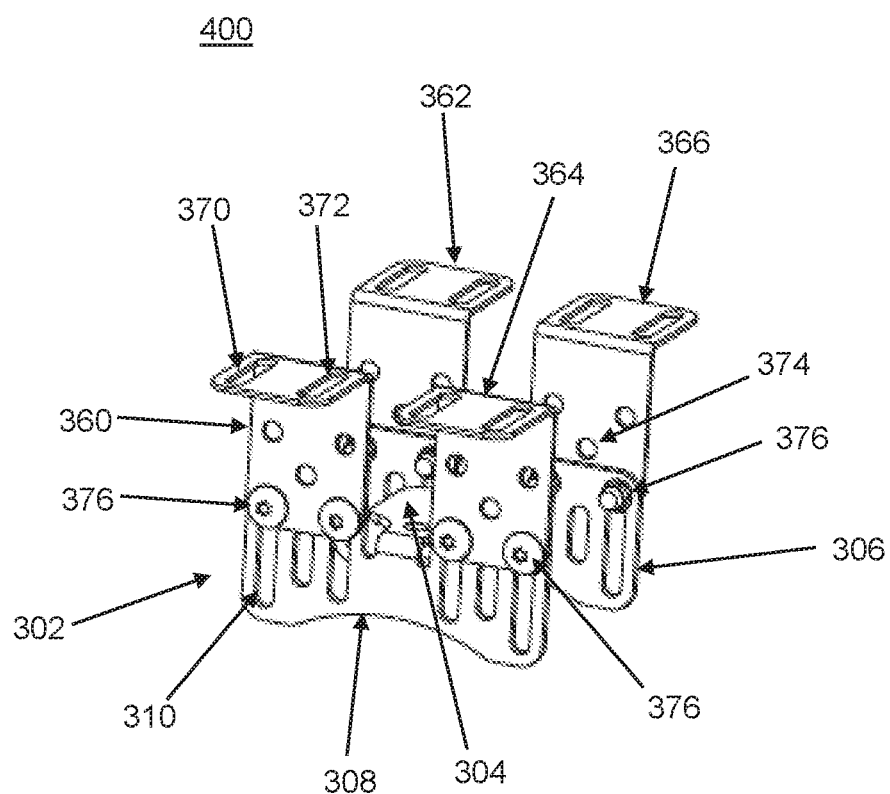
FIG. 9 is a perspective, assembled view of another embodiment of a flexible bracket design of the present disclosure.

FIG. 9 illustrates an embodiment of flexible bracket system 400. The flexible bracket system 400 includes the center bracket 302 and a series of angled brackets 360, 362, 364 and 366. Each of the angled brackets 360, 362, 364 and 366 are the same structure as angled brackets 340 and 342 discussed above. Each of the angled brackets 360, 362, 364 and 366 includes a pattern of holes 374 on one leg of the bracket component and oblong openings 370 and 372 on the second leg of the bracket component.

The angled brackets 360, 362, 364 and 366 are attached to the center bracket 302 by connectors (shown as bolts 376). In this embodiment, the angled brackets 360 and 364 are attached to the second wing 308 and the angled brackets 362 and 366 are attached to the first wing 306. The holes 374 in the angled brackets 360, 362, 364 and 366 are attached to corresponding oblong openings 310 in the first and second wings 306 and 308 by the bolts 376. When the connection is sufficiently loose, the angled brackets 360, 362, 364 and 366 are vertically adjustable along the long axis of the oblong openings 310.

In the configuration shown, the second leg of each of the angled brackets 360, 362, 364 and 366 includes a first oblong opening 370 and second oblong opening 372. The oblong openings 370 and 372 in each of the angled brackets 360, 362, 364 and 366 facilitate connections for installation. For example, an installer may drive screws through the oblong openings 370 and 372 into the frame or housing structure of a vehicle during installation. The oblong openings 370 and 372 allow some adjustment and/or may improve the ease in matching the bracket to preselected locations in a frame, housing or other structure for implementation. In some embodiments, the angled brackets 360, 362, 364 and 366 may facilitate connections to additional bracket components to facilitate additional configurations for installation purposes.

In some embodiments, one or more of the angled brackets 360, 362, 364 and 366 may be reconfigured and/or replaced to facilitate additional bracket configurations. For example, angled bracket 360 may be turned 90 degrees to extend horizontally from the center bracket 302, angled bracket 362 may be flipped such that the oblong openings 370 and 372 correspond to the oblong openings 310 in the center bracket 302, and angled brackets 364 and 366 may be removed and replaced with an actuating bracket 320. In light of this disclosure, one skilled in the art will recognize that the flexible bracket systems 300 and 400 facilitate multiple configurations and options using the center bracket 302 and one or more additional bracket components including the angled brackets, actuating brackets, and other ancillary bracket components.

Figure 10:
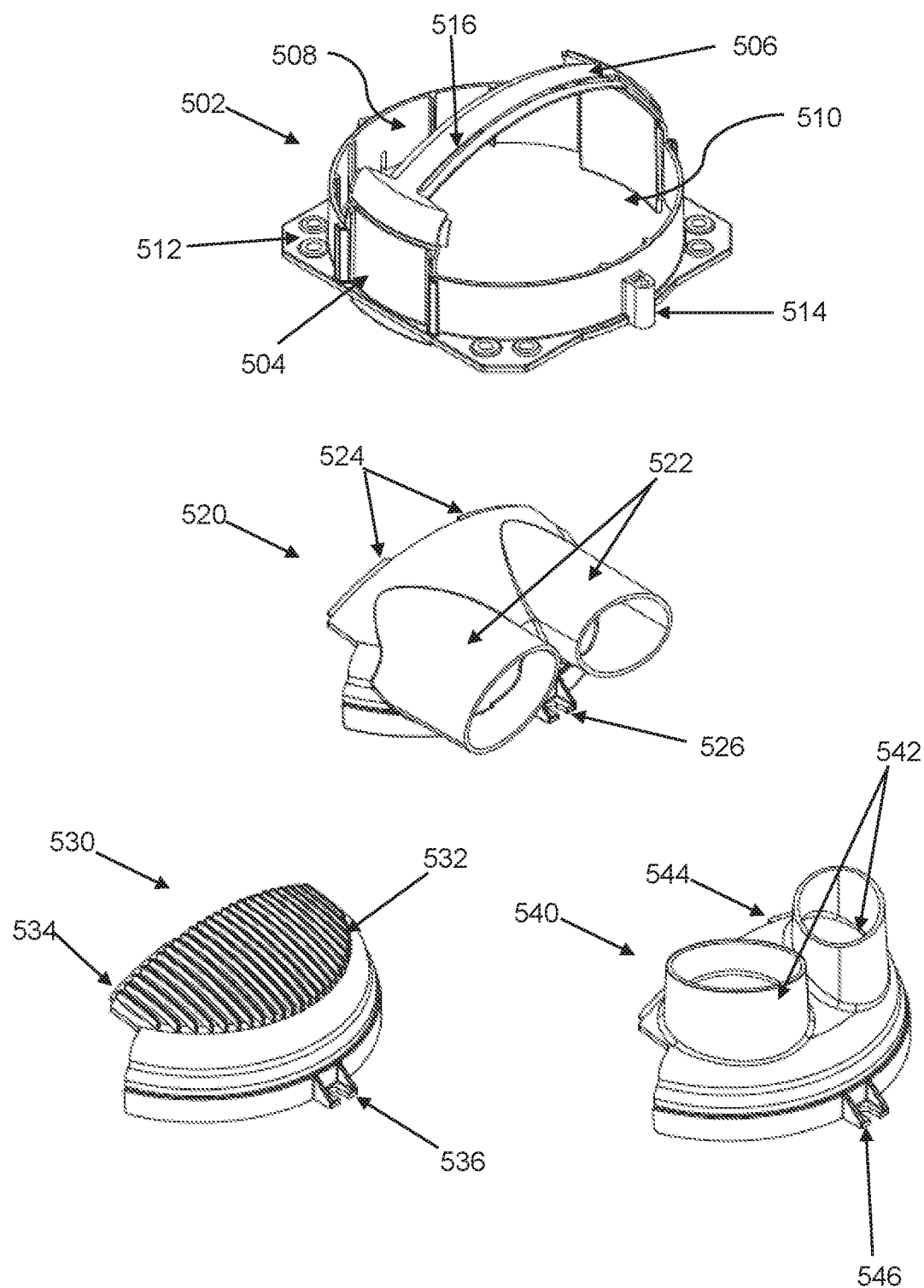
FIG. 10 is a perspective view of embodiments of components for a flexible vent design of the present disclosure.

FIG. 10 illustrates a series of components for a flexible ventilation system for an air modification apparatus, such as the dual fan apparatus. The components include a ventilation housing bracket 502 and interchangeable ventilation components, including a horizontal duct component 520, a vent component 530 and a vertical duct component 540.

In this embodiment, the ventilation housing bracket 502 includes a circular base section 504 and a crossbar 506 including slots 516. In some embodiments, the ventilation housing bracket 502 may operate as a fan housing component as discussed elsewhere herein. The bottom of the ventilation housing bracket 502 includes a series of attachment ports 512 designed to facilitate connection to the structure of an air modification device. The attachment ports 512 may be configured to fit a specific structure of an air modification device. In some embodiments, the attachment ports 512 are configured as a universal connection to allow the ventilation housing bracket 502 to attach to multiple structural designs. The ventilation housing bracket 502 also includes connection port 514 to facilitate securing the interchangeable components—e.g. the horizontal duct component 520, the vent component 530 and the vertical duct component 540—to the ventilation housing bracket 502.

In this embodiment, the circular base section 504 and the crossbar 506 define a first opening 508 and a second opening 510. The first and second openings 508 and 510 are configured to receive the interchangeable components including the horizontal duct component 520, the vent component 530, the vertical duct component 540 and other interchangeable components.

The horizontal duct component 520 includes two horizontal ducts 522, protrusion 524 and slot 526. In some embodiments, the horizontal duct component 520 may include a single horizontal duct 522 or multiple horizontal ducts 522. In the embodiment shown, the output opening in the horizontal ducts 522 may connect with additional ducting (not shown) to further direct airflow to desired locations.

In this embodiment, the horizontal duct component 520 is adapted to fit in one of the first and/or second openings 508 and 510. When the horizontal duct component 520 is placed in the first or second opening 508 or 510, the protrusion 524 engages the slot 516 in the crossbar 506. In some embodiments, the horizontal duct component 520 includes a plurality of protrusions 524 and the crossbar 506 includes a plurality of corresponding slots 516. In some embodiments, the protrusions 524 may be located on the crossbar 506 and the slots 516 may be located on the horizontal duct component 520. One skilled in the art will recognize that alternative connections, such as the connection options discussed elsewhere herein, may be implemented in place of the protrusions 524 and the slots 516 and remain within the scope and spirit of the disclosure.

In addition, the slot 526 is located over the connection port 514 when the horizontal duct component 520 is in place. In the embodiment shown, the horizontal duct component 520 may be fixed in place by using a connector such as a screw, bolt, pin or other element to connect the slot 526 to the connection port 514. In some embodiments, the slot 526 and connection port 514 may be modified to provide another connection option, such as a snap connection, a friction connection, a magnetic connection, an adhesive connection, a welded connection or another connection option.

During operation, the horizontal ducts 522 operate to direct air horizontally from the air modification device. Additional ducting (not shown) that directs air to a specific location may be attached to the horizontal ducts 522. For example, an additional duct may attach to the output of one of the horizontal ducts 522 and pipe conditioned air to a vehicle cabin vent and another additional duct may attach to the output of the second horizontal duct 522 and pipe conditioned air to a defrost vent in a vehicle dash.

The vent component 530 includes a vent section 532, protrusion 534 and slot 536. In this embodiment, the vent component 530 is adapted to fit in one of the first and/or second openings 508 and 510. When the vent component 530 is placed in the first or second opening 508 or 510, the protrusion 534 engages the slot 516 in the crossbar 506. In some embodiments, the vent component 530 includes a plurality of protrusions 534 and the crossbar 506 includes a plurality of corresponding slots 516. In some embodiments, the protrusions 534 may be located on the crossbar 506 and the slots 516 may be located on the vent component 530. One skilled in the art will recognize that alternative connections, such as the connection options discussed elsewhere herein, may be implemented in place of the protrusions 534 and the slots 516 and remain within the scope and spirit of the disclosure.

In addition, the slot 536 is located over the connection port 514 when the vent component 530 is in place. In the embodiment shown, the vent component 530 may be fixed in place by using a connector such as a screw, bolt, pin or other element to connect the slot 536 to the connection port 514. In some embodiments, the slot 536 and connection port 514 may be modified to provide another connection option, such as a snap connection, a friction connection, a magnetic connection, an adhesive connection, a welded connection or another connection option.

During operation, the vent section 532 operates to allow airflow to pass to or from the air modification device. For example, the air freely moves out of the vent section 532 when the air modification device is moving air towards the vent section 532 and the air freely moves into the vent section 532 when the air modification device is pulling air towards the vent section 532. In some installations, the vent section 532 may be located at selected locations to allow the free airflow.

The vertical duct component 540 includes two vertical ducts 542, protrusion 544 and slot 546. In some embodiments, the vertical duct component 540 may include a single vertical duct 542 or multiple vertical ducts 542. In the embodiment shown, the output opening in the vertical ducts 542 may connect with additional ducting (not shown) to further direct airflow to desired locations.

In this embodiment, the vertical duct component 540 is adapted to fit in one of the first and/or second openings 508 and 510. When the vertical duct component 540 is placed in the first or second opening 508 or 510, the protrusion 544 engages the slot 516 in the crossbar 506. In some embodiments, the vertical duct component 540 includes a plurality of protrusions 544 and the crossbar 506 includes a plurality of corresponding slots 516. In some embodiments, the protrusions 544 may be located on the crossbar 506 and the slots 516 may be located on the vertical duct component 540. One skilled in the art will recognize that alternative connections, such as the connection options discussed elsewhere herein, may be implemented in place of the protrusions 544 and the slots 516 and remain within the scope and spirit of the disclosure.

In addition, the slot 546 is located over the connection port 514 when the vertical duct component 540 is in place. In the embodiment shown, the vertical duct component 540 may be fixed in place by using a connector such as a screw, bolt, pin or other element to connect the slot 546 to the connection port 514. In some embodiments, the slot 546 and connection port 514 may be modified to provide another connection option, such as a snap connection, a friction connection, a magnetic connection, an adhesive connection, a welded connection or another connection option.

During operation, the vertical ducts 542 operate to direct air vertically from the air modification device. Additional ducting (not shown) that directs air to a specific location may be attached to the vertical ducts 542. For example, an additional duct may attach to the output of one of the vertical ducts 542 and pipe conditioned air to a vehicle cabin vent and another additional duct may attach to the output of the second vertical duct 542 and pipe conditioned air to a defrost vent in a vehicle dash.

In some embodiments, the interchangeable components may include multiple duct and/or vent characteristics. For example, one interchangeable component may include one vertical duct 542 and one horizontal duct 522. For another example, an interchangeable component may include a vent section 532 and a horizontal duct 522.

Some embodiments of the flexible ventilation system may include ventilation housing bracket 502 which may include an alternative configuration of openings 508 and 510 with compatible interchangeable components. For example, the ventilation housing bracket 502 may include three openings which receive three compatible interchangeable components. In addition, some embodiments of the interchangeable components may include capping elements to prevent airflow through the capped area and/or increase the airflow through adjacent vents and/or ducts.

Figure 11:
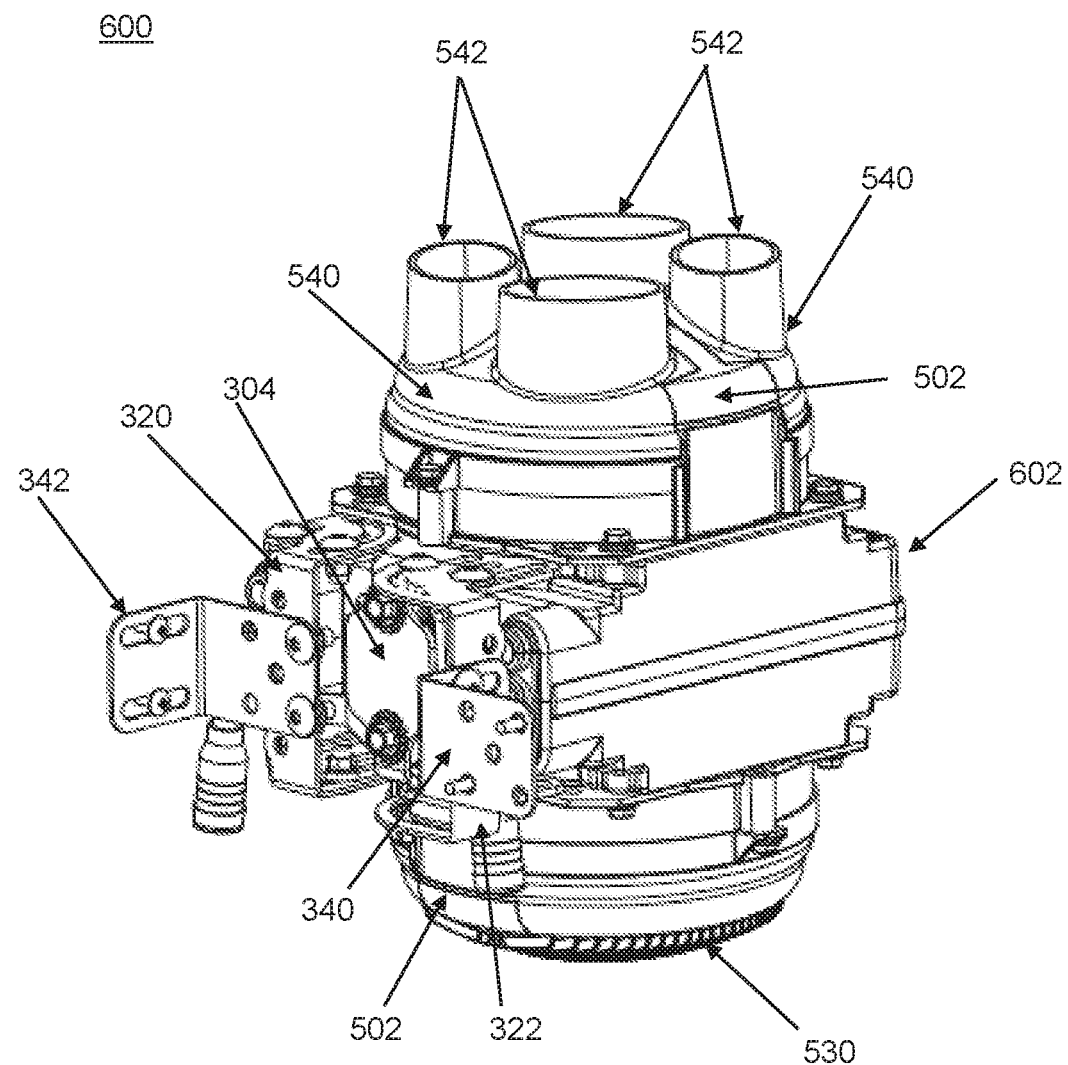
FIG. 11 is a perspective, assembled view of an embodiment of a dual fan design with the flexible bracket and flexible vent design of the present disclosure.

FIG. 11 shows an embodiment of a flexible air modification system 600 which includes the air modification component with a configuration of the flexible bracket system and a configuration of the flexible ventilation system. For purposes of discussion herein, the air modification component is shown as the dual fan apparatus 602 which operates consistent with the dual fan apparatus designs discussed above. One skilled in the art will recognize that the dual fan apparatus 602 may be replaced with another air modification component—such as a blower, a heater, an air conditioner or another component—and remain within the scope and spirit of the disclosure.

In the embodiment shown, the mounting bracket 304 of the center bracket 302 attaches to the dual fan apparatus 602. The first actuating bracket 320 is in a first position with the center plate 328 of the first actuating bracket 320 similar to the center bracket mounting plate 304. Attached to the first actuating bracket 320 is the first angled bracket 342. The second actuating bracket 322 is rotated to a second position with the center plate 328 of the second actuating bracket 322 approximately perpendicular to the mounting plate 304. The second angled bracket 340 is attached to the second actuating bracket 322.

This embodiment of the flexible air modification system 600 includes a flexible ventilation system on the top and bottom. On the top, the flexible ventilation system includes the ventilation housing bracket 502 and two vertical duct components 540. Each of the two vertical duct components 540 include two vertical ducts 542. Each of the vertical ducts 542 may attach to one or more additional duct components (not shown) that may direct airflow to or from a select location.

The flexible ventilation system on the bottom portion of the air modification system 600 includes a ventilation housing bracket 502 and vent component 530. The vent component 530 allows air to flow in or out of the bottom of the flexible air modification system 600. The second interchangeable component is not shown in this embodiment, but may comprise any compatible interchangeable component.

In some embodiments, one or more of the interchangeable components may also be part of the vehicle housing or be configured to fit into the vehicle housing. For example, the vent component 530 may also be built into the floorboard vent of a vehicle. For another example, the top of the air modification system 600 may fit into a cutout in the dash of a vehicle. In such embodiments, the interchangeable components may be customized options for different vehicles.

Figure 12:
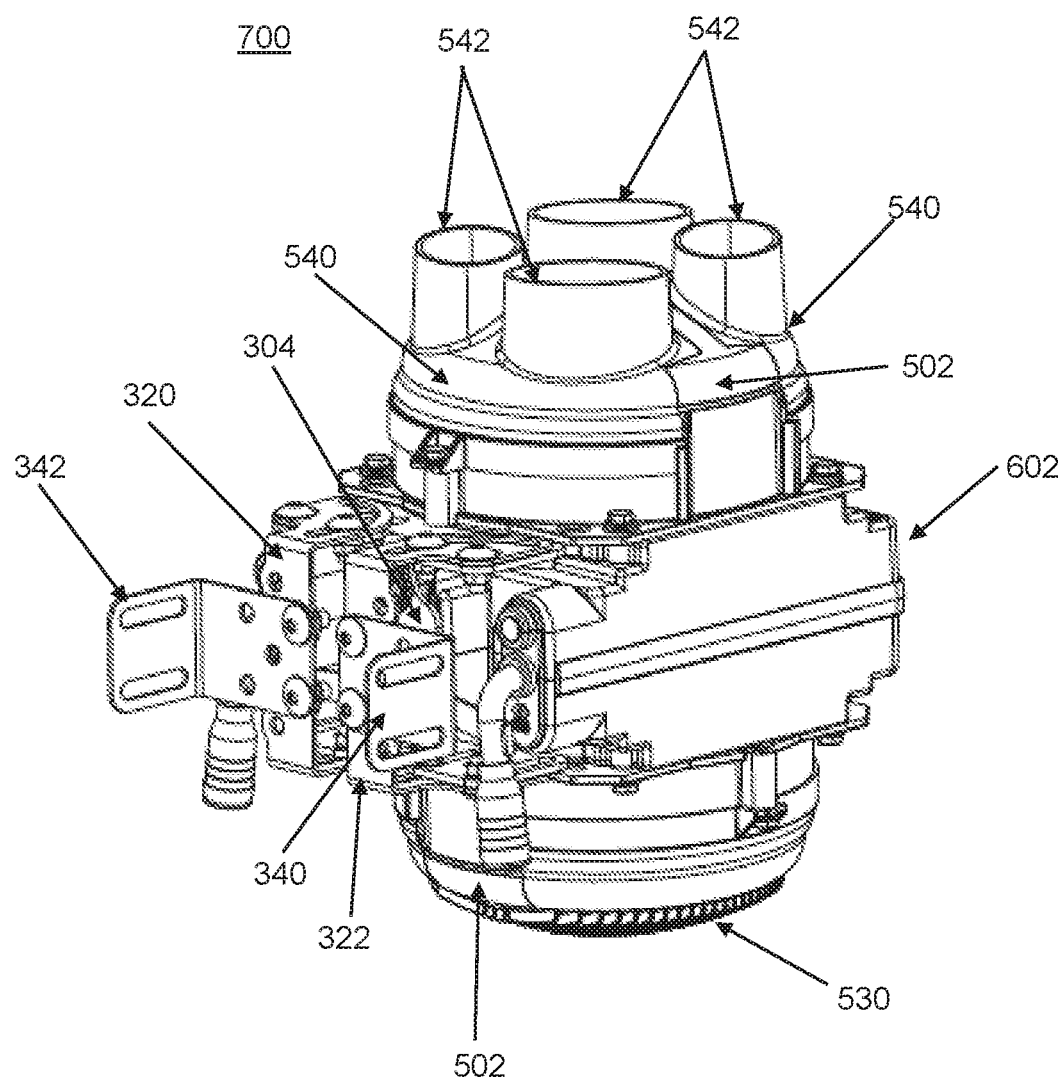
FIG. 12 is a perspective, assembled view of another embodiment of a dual fan design with the flexible bracket and flexible vent design of the present disclosure.

FIG. 12 shows flexible air modification system 700 which includes the air modification component with a configuration of the flexible bracket system and a configuration of the flexible ventilation system. The flexible air modification system 700 shows an alternative embodiment of the air modification system 600 discussed above. Similar to the air modification system 600, the top flexible ventilation system of the air modification system 700 includes two vertical duct components 540 and the bottom flexible ventilation system includes a vent component 530.

In addition, the mounting bracket 304 of the center bracket 302 attaches to the dual fan apparatus 602 and the first actuating bracket 320 is in a first position with the center plate 328 of the first actuating bracket 320 similar to the center bracket mounting plate 304. Attached to the first actuating bracket 320 is the first angled bracket 342.

In contrast to the flexible air modification system 600, the second actuating bracket 322 also rotated to a position with the center plate 328 of the second actuating bracket 322 similar to the mounting plate 304. In addition, the second angled bracket 340 is attached to the second actuating bracket 322 using the holes 344 and presenting the oblong openings 346 for installation.

Figure 13:
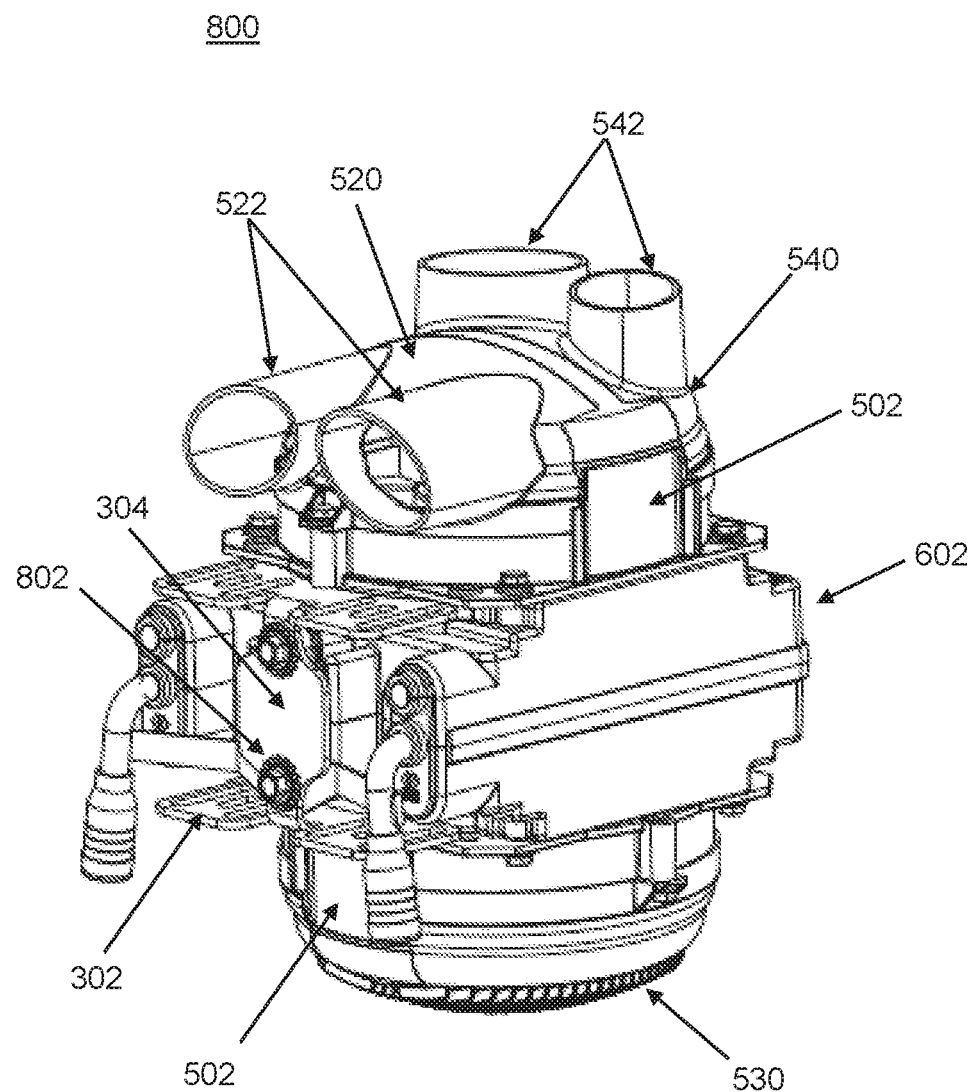
FIG. 13 is a perspective, assembled view of another embodiment of a dual fan design with the flexible bracket and flexible vent design of the present disclosure.

FIG. 13 shows an embodiment of a flexible air modification system 800 which includes the air modification component with a center bracket 302 of the flexible bracket system and a configuration of the flexible ventilation system. In the embodiment shown, the mounting bracket 304 of the center bracket 302 attaches to the dual fan apparatus 602. In the embodiment shown, the mounting bracket 304 is attached to the dual fan apparatus 602 using bolts 802. Although connectors have been shown and described as bolts 802, the components may be connected using alternative components such as screws, pins, friction components and/or other components. In addition, alternative connections may be implemented instead of separate connectors—such as adhesives, welds, rivets and other connections. One skilled in the art will recognize that the connections may be created using removable connection options (i.e. options that facilitate the option to remove, modify or otherwise regularly manipulate the connection option), semi-permanent connection options (i.e. options that are not intended to be disconnected, but allow for disconnection without damaging the integrity of the components) or permanent connection options (i.e. options that are not intended to be disconnected and are likely to damage the integrity of the components if steps are taken to disconnect the components). One skilled in the art will recognize that one or more types of connections may be implemented in the flexible bracket system.

This embodiment of the flexible air modification system 800 includes a flexible ventilation system on the top and bottom. On the top, the flexible ventilation system includes the ventilation housing bracket 502, one vertical duct component 540 and one horizontal duct component 520. The horizontal duct component 520 includes two horizontal ducts 522 and the vertical duct component 540 includes two vertical ducts 542. Each of the ducts 522 and 542 may attach to one or more additional duct components (not shown) that may direct airflow to or from a select location.

The flexible ventilation system on the bottom portion of the air modification system 800 includes a ventilation housing bracket 502 and vent component 530. The second interchangeable component is not shown in this embodiment, but may comprise any compatible interchangeable component.

Figure 14:
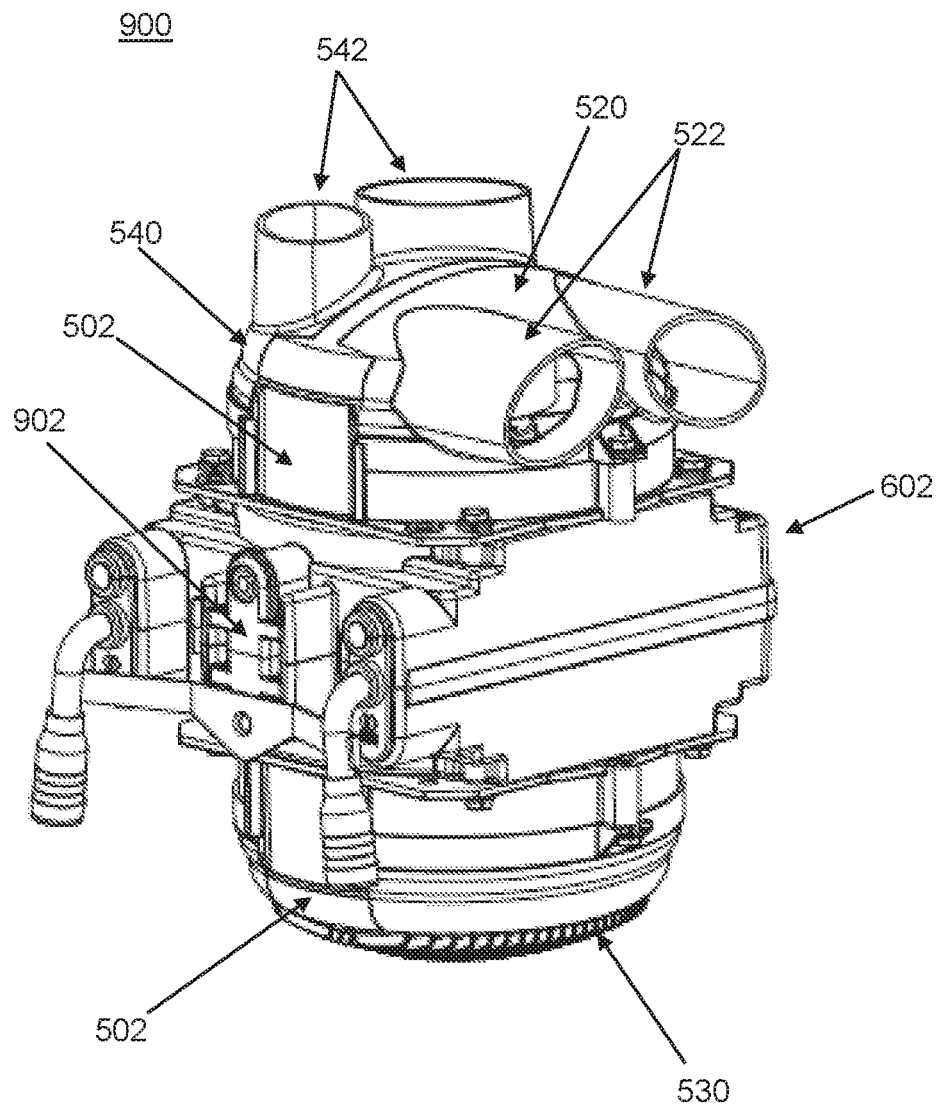
FIG. 14 is a perspective, assembled view of an embodiment of a dual fan design with the flexible vent design of the present disclosure.

FIG. 14 shows an embodiment of a flexible air modification system 900 which includes the air modification component with a configuration of the flexible ventilation system. This embodiment shows a mounting surface 902 of the dual fan apparatus 602 located between connectors to the dual fan apparatus 602. In the embodiment shown, a mounting bracket 304 (not shown in FIG. 14) may be attached to the dual fan apparatus 602 on the mounting surface 902. In some embodiments, the dual fan apparatus 602 may include multiple mounting surfaces 902 to allow different options for mounting the flexible bracket system to the dual fan apparatus 602. In some embodiments, the dual fan apparatus 602 may include alternative mounting surfaces 902 that facilitate attachment of the dual fan apparatus 602 and a flexible bracket system.

This embodiment of the flexible air modification system 900 includes a flexible ventilation system on the top and bottom. On the top, the flexible ventilation system includes the ventilation housing bracket 502, one vertical duct component 540 and one horizontal duct component 520. The horizontal duct component 520 includes two horizontal ducts 522 and the vertical duct component 540 includes two vertical ducts 542. Each of the ducts 522 and 542 may attach to one or more additional duct components (not shown) that may direct airflow to or from a select location.

In this embodiment, the ventilation housing bracket 502 is rotated 90 degrees around a vertical axis of the dual fan apparatus 602 relative to the orientation shown in FIG. 13. One skilled in the art will recognize that the ventilation housing bracket 502 may be designed to attach to the dual fan apparatus 602 at a variety of orientations. In some embodiments, the ventilation housing bracket 502 may be rotatable allowing a person to adjust the orientation of the ventilation housing bracket 502 during installation. Designs allowing the rotation and/or change in orientation of the ventilation housing bracket 502 facilitate additional flexibility in directing the airflow from the dual fan apparatus 602 and/or into the dual fan apparatus 602.

The flexible ventilation system on the bottom portion of the air modification system 900 includes a ventilation housing bracket 502 and vent component 530. The second interchangeable component is not shown in this embodiment, but may comprise any compatible interchangeable component. In some embodiments, the ventilation housing component 502 may also be rotatable or reoriented on the bottom of the dual fan apparatus 602. In some embodiments, the top ventilation housing bracket 502 and the bottom ventilation housing bracket 502 may have different orientations.

Figure 15:
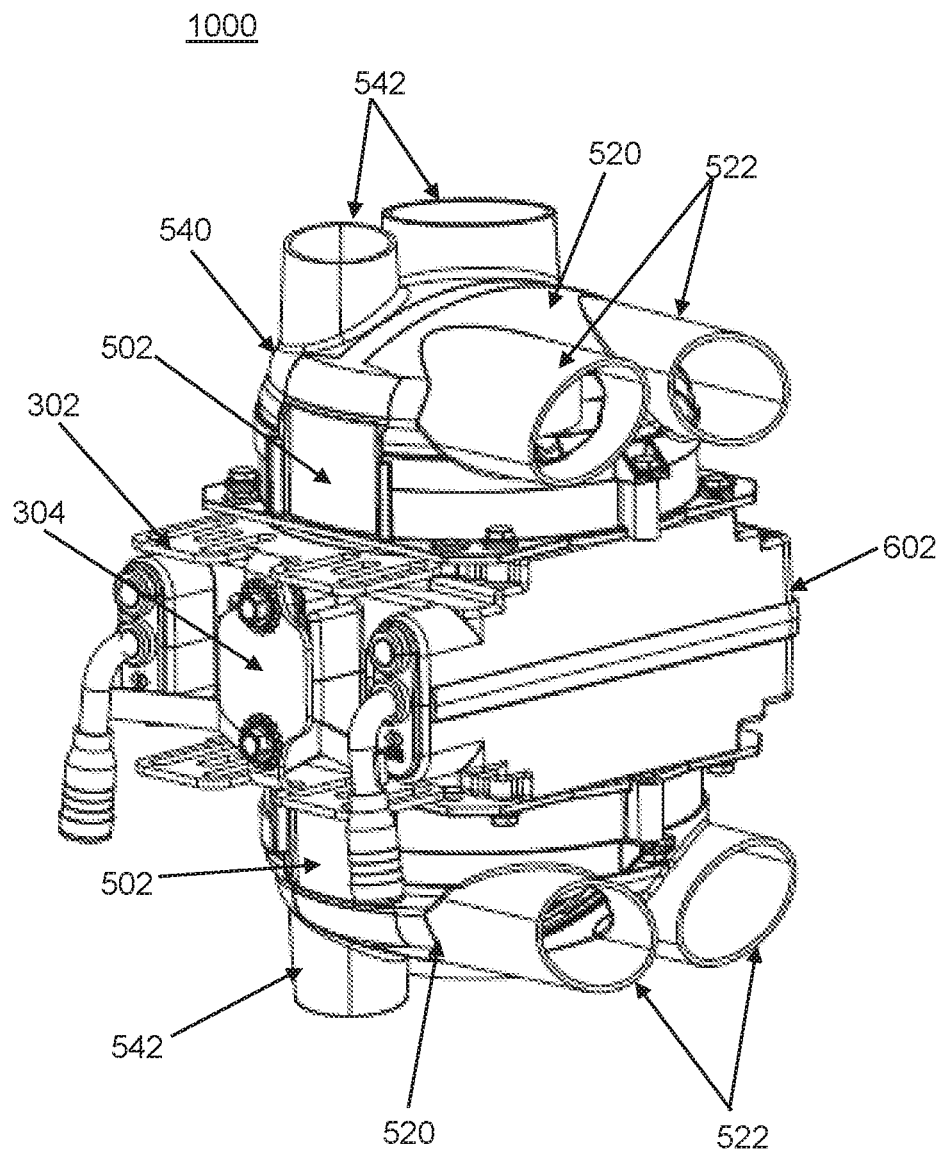
FIG. 15 is a perspective, assembled view of another embodiment of a dual fan design with the flexible bracket and flexible vent design of the present disclosure.

FIG. 15 shows an embodiment of a flexible air modification system 1000 which includes the air modification component with center bracket 302 of the flexible bracket system and a configuration of the flexible ventilation system. In the embodiment shown, the mounting bracket 304 of the center bracket 302 attaches to the dual fan apparatus 602.

This embodiment of the flexible air modification system 1000 includes a flexible ventilation system on the top and bottom. On the top, the flexible ventilation system includes the ventilation housing bracket 502, one vertical duct component 540 and one horizontal duct component 520. The horizontal duct component 520 includes two horizontal ducts 522 and the vertical duct component 540 includes two vertical ducts 542. Each of the ducts 522 and 542 may attach to one or more additional duct components (not shown) that may direct airflow to or from a select location.

In this embodiment, the flexible ventilation system bottom also includes the ventilation housing bracket 502, one vertical duct component 540 and one horizontal duct component 520. The horizontal duct component 520 includes two horizontal ducts 522 and the vertical duct component 540 includes two vertical ducts 542. Each of the ducts 522 and 542 may attach to one or more additional duct components (not shown) that may direct airflow to or from a select location.

In some embodiments, the flexible ventilation system includes control elements to direct air, stop the airflow or otherwise control the airflow through the air modification system. In some embodiments, the flexible ventilation system may include vents with fins to direct the airflow. In some embodiments, the flexible ventilation system may include independent valves within the ducts which allow the user to open, close or constrict the airflow through the ducts. The independent valves may allow a user to further select the output location of the air. For example, the user may open the duct associated with the defrost outputs and close the other ducts. Such a selection would operate to both direct the air and increase the airflow through the open path. Ventilation system controls may be any type of control operable to manage the airflow characteristics through the ventilation system, such as mechanical controls, electrical controls, electromechanical controls, etc.

The flexible airflow systems described herein may be utilized in conjunction or independently. For example, the dual fan apparatus 100 may be used with a set bracket and duct output. For another example, the flexible bracket system may be used to mount a single fan heating unit which incorporates a set ventilation output. For yet another example, the flexible duct design may be implemented on a single fan air conditioning unit with a set mounting bracket. One skilled in the art will recognize the various combinations that may be implemented using the flexible systems described herein.

During implementation of a flexible airflow system, a user may select an air modification component compatible with the flexible bracket system and the flexible ventilation system. Some embodiments of a flexible airflow system may include a conversion kit or component to allow multiple air modification components to be compatible with the flexible bracket system and/or the flexible ventilation system. As discussed above, the air modification component may be any heater, air conditioning unit, fan, blower or other device that changes the characteristics of the air. The dual fan apparatus 602 will be referred to for illustration.

The user may then attach the center bracket 302 to the dual fan apparatus 602. The user may also select the bracket components needed to facilitate attachment to the frame, housing or other installation feature of the vehicle or other structure in which the flexible airflow system will be mounted. For example, the user may select one actuating bracket 320 with an angled bracket 340 attached thereto and two angled brackets 340 attached directly to the wings 306 and 308 of the center bracket 302. As illustrated in the figures and discussed above, the bracket components may be selected, arranged and oriented to facilitate multiple bracket configurations. The user's selection and configuration of bracket components allows for the user to custom fit installations of the dual fan apparatus 602.

After the center bracket 302 is attached, the user may attach the additional bracket components to the center bracket 302. The user may leave one or more of the connections sufficiently loose to allow the bracket components to rotate or otherwise allow restricted movement for the installation of the dual fan apparatus 602. For example, the user may leave the actuating bracket 320 loosely attached to the center bracket 302 to allow the actuating bracket 320 to rotate into an optimal position during installation.

The user may then select the orientation for attaching a ventilation housing bracket 502 to the top of the dual fan apparatus 602. The user may also select the orientation for attaching a ventilation housing bracket 502 to the bottom of the dual fan apparatus 602. The user may then attach the ventilation housing bracket 502 to the top of the dual fan apparatus 602 and the ventilation housing bracket 502 to the bottom of the dual fan apparatus 602. The user may also select the ventilation components needed to facilitate the intended airflow features for the vehicle or other structure in which the flexible airflow system will be installed. For the ventilation housing brackets 502 shown, the user will select two interchangeable ventilation components for the top and two interchangeable ventilation components for the bottom of the dual fan apparatus 602. For example, the user may select a horizontal duct component 520 and a vent component 530 for the top ventilation components and a horizontal duct component 520 and a vertical duct component 540 for the bottom ventilation components.

Once the user has assembled the selected configuration of the flexible airflow system, the user may install the flexible airflow system in the desired structure. For discussion herein, a vehicle is the selected structure for implementation. The user may place the flexible airflow system in the desired location within the vehicle and connect one or more bracket components to the vehicle frame, housing and/or other installation points. In some cases, the bracket components may be adjusted to better fit the vehicle installation points during the installation process. In some cases, one or more of the bracket components may be attached to the vehicle prior to attaching the bracket components to the center bracket or an intermediate bracket component. The installation connections may use bolts, screws, welds and/or any other connection as discussed above. Once installed any loose connections may be tightened to further secure the flexible airflow system in a fixed location.

Once the flexible airflow system is attached in the vehicle, additional ventilation and/or duct elements may be connected. For example, additional ducts directing air to select locations throughout the vehicle may be attached to the horizontal duct ports, vertical duct ports and/or any other duct ports. For another example, ventilation faceplates may be connected to one or more ports in some embodiments.

Any additional operation connection may also be completed during installation. For example, electrical control systems may be installed. For another example, fluid and gas tubing for the thermal exchange elements may be attached.

One skilled in the art will recognize that the selection of one or more components and/or orientations for the components may depend upon other selections. Accordingly, the user may select a complete set of components and an intended configuration prior to assembling the components of the flexible airflow system for installation. In addition, the order of selection and/or attachment may vary and remain within the scope and disclosure of the invention. Finally, one or more attachment steps for the bracket components or the interchangeable ventilation components may occur within the installation process.

The invention being thus described and further described in the claims, it will be obvious that the same may be varied in many ways. Such variations are not to be regarded as a departure from the spirit and scope of the invention and all such modifications as would be obvious to one skilled in the art are intended to be included within the scope of the apparatus described.

The invention claimed is:
1. A dual fan apparatus comprising:
   a dual fan system, comprising:
      a first axial fan;
      a second axial fan, wherein one side of the second axial fan is directed to the first axial fan and an opposite side of the second axial fan from the first axial fan is fluidly connected to a second air port, and
      wherein one side of the first axial fan is directed to the second axial fan and an opposite side of the first axial fan from the second axial fan is fluidly connected to a first air port, and wherein said first axial fan and said second axial fan operate in coordination to move air through said dual fan apparatus from said first air port to said second air port, and
a housing configured to hold the first axial fan and said second axial fan;
a flexible ventilation system, comprising:
a plurality of interchangeable components,
a first ventilation housing bracket connected to said first air port, wherein said first ventilation housing bracket includes at least one opening configured to receive one of said interchangeable components, and
a second ventilation housing bracket connected to said second air port,
wherein said second ventilation housing bracket includes at least one opening configured to receive another one of said interchangeable components; and
a flexible bracket system, comprising:
a center bracket connected to said housing, a first actuating bracket connected to said center bracket with a first variable connection, wherein said first variable connection allows said first actuating bracket to rotate relative to said center bracket, and wherein said center bracket is between said housing and said first actuating bracket, and a second actuating bracket connected to said center bracket with a second variable connection, wherein said second variable connection allows said second actuating bracket to rotate relative to said center bracket, and wherein said center bracket is between said housing and said second actuating bracket,
wherein said first variable connection and said second variable connection allow said flexible bracket system to be assembled in a plurality of configurations.

2. The dual fan apparatus according to claim 1, wherein said first axial fan and said second axial fan are reversible and are operable to move air from said second air port to said first air port.

3. The dual fan apparatus according to claim 1, comprising a thermal exchange component between said first axial fan and said second axial fan.

4. The dual fan apparatus according to claim 3, wherein said first axial fan rotates in a first direction pushing the air to the thermal exchange component and said second axial fan rotates in a second direction pulling the air from the thermal exchange component.

5. The dual fan apparatus according to claim 3, wherein said housing encases said first axial fan, said thermal exchange component and said second axial fan, and comprises said first air port and said second air port.

6. The dual fan apparatus according to claim 1, wherein said housing comprises a mounting surface and said center bracket comprises a mounting plate configured to connect with said mounting surface.

7. The dual fan apparatus according to claim 1, wherein said plurality of interchangeable components comprise at least one of a horizontal duct component, a vertical duct component and a vent component.

8. The dual fan apparatus according to claim 1, wherein said dual fan apparatus is installed in a vehicle and said flexible bracket system is configured to facilitate mounting said dual fan apparatus to said vehicle.

9. The dual fan apparatus according to claim 8, wherein said vehicle comprises at least one of a car, a truck, a tractor, an all-terrain vehicle, a golf cart, a boat and a trailer.

10. The dual fan apparatus according to claim 3, further comprising a user interface which facilitates control of at least one of an airflow direction through said dual fan apparatus, an air speed through said dual fan apparatus and a temperature of said thermal exchange component.

11. A dual fan apparatus comprising:
a dual fan system, comprising:
a first axial fan;
a second axial fan, wherein one side of the second axial fan is directed to the first axial fan and an opposite side of the second axial fan from the first axial fan is fluidly connected to a second air port, and
wherein one side of the first axial fan is directed to the second axial fan and an opposite side of the first axial fan from the second axial fan is fluidly connected to a first air port, and
wherein said first axial fan and said second axial fan operate in coordination to move air through said dual fan apparatus from said first air port to said second air port, and
a housing configured to hold the first axial fan and said second axial fan;
a flexible ventilation system, comprising:
a plurality of interchangeable ventilation components,
a first ventilation housing bracket connected to said first air port, wherein said first ventilation housing bracket includes at least one first airflow opening configured to receive one of said interchangeable ventilation components, wherein the first axial fan and the second axial fan move the air through said one of said interchangeable ventilation components, and
a second ventilation housing bracket connected to said second air port,
wherein said second ventilation housing bracket includes at least one second airflow opening configured to receive an other one of said interchangeable ventilation components, wherein the first axial fan and the second axial fan move the air through said other one of said interchangeable ventilation components; and
a flexible bracket system, comprising:
a center bracket connected to said housing, a first actuating bracket connected to said center bracket with a first variable connection, wherein said first variable connection allows said first actuating bracket to rotate relative to said center bracket, and wherein said center bracket is between said housing and said first actuating bracket, and a second actuating bracket connected to said center bracket, wherein said center bracket is between said housing and said second actuating bracket, wherein said second actuating bracket comprises a second variable connection, wherein said second variable connection allows said second actuating bracket to rotate relative to said center bracket, wherein said first variable connection and said second variable connection are independently movable and allow said flexible bracket system to be assembled in a plurality of configurations.

12. The dual fan apparatus according to claim 11, wherein said first axial fan and said second axial fan are reversible and are operable to move air from said second air port to said first air port.

13. The dual fan apparatus according to claim 11, comprising a thermal exchange component between said first axial fan and said second axial fan.

14. The dual fan apparatus according to claim 13, wherein said first axial fan rotates in a first direction pushing the air to the thermal exchange component and said second axial fan rotates in a second direction pulling the air from the thermal exchange component.

15. The dual fan apparatus according to claim 13, wherein said housing encases said first axial fan, said thermal exchange component and said second axial fan, and comprises said first air port and said second air port.

16. The dual fan apparatus according to claim 11, wherein said housing comprises a mounting surface and said center bracket comprises a mounting plate configured to connect with said mounting surface.

17. The dual fan apparatus according to claim 11, wherein said plurality of interchangeable ventilation components comprise at least one of a horizontal duct component, vertical duct component and a vent component.

18. The dual fan apparatus according to claim 11, wherein said dual fan apparatus is installed in a vehicle and said flexible bracket system is configured to facilitate mounting said dual fan apparatus to said vehicle.

19. The dual fan apparatus according to claim 18, wherein said vehicle comprises at least one of a car, a truck, a tractor, an all-terrain vehicle, a golf cart, a boat and a trailer.

20. The dual fan apparatus according to claim 13, further comprising a user interface, which facilitates control of at least one of an airflow direction through said dual fan apparatus, an air speed through said dual fan apparatus and a temperature of said thermal exchange component.

* * * * *

UNITED STATES PATENT AND TRADEMARK OFFICE
CERTIFICATE OF CORRECTION

PATENT NO. : 10,288,020 B2
APPLICATION NO. : 15/009161
DATED : May 14, 2019
INVENTOR(S) : Stephen William O'Brien It is certified that error appears in the above-identified patent and that said Letters Patent is hereby corrected as shown below:

In the Specification

Column 5, Line 45: delete "in to" and insert --into--

Column 5, Line 58: delete "onto" and insert --into--

Column 6, Line 29: delete "120" and insert --100--

Column 6, Lines 31-32: delete "embodiment" and insert --embodiments--

Column 7, Line 20: delete "though" and insert --through--

Column 9, Line 36: insert --of-- between "directed out" and "vent"

Column 10, Line 58: delete "onto" and insert --into--

Column 11, Line 16: delete "though" and insert --through--

Column 13, Line 5: delete "bracket" and insert --plate--

Column 13, Line 7: delete "bracket" and insert --plate--

Column 14, Lines 53-54: delete "In some embodiments of flexible" and replace with --In some embodiments, flexible--

Column 14, Line 56: delete "having" and insert --may have--

Column 14, Line 58: delete "facilitates extending" and insert --extend--

Signed and Sealed this
Twenty-fifth Day of June, 2019

Andrei Iancu
*Director of the United States Patent and Trademark Office*

CERTIFICATE OF CORRECTION (continued)
U.S. Pat. No. 10,288,020 B2

Column 14, Line 59: delete "having" and insert --may have--

Column 18, Line 20: delete "bracket" and insert --plate--

Column 18, Line 65: delete "bracket" and insert --plate--

Column 19, Line 15: delete "bracket" and insert --plate--

Column 19, Line 17: delete "bracket" and insert --plate--

Column 19, Line 59: delete "bracket" and insert --plate--

Column 20, Line 39: delete "bracket" and insert --plate--

In the Claims

Column 23, Line 56, Claim 7: delete "comprise" and insert --comprises--

Column 25, Line 14, Claim 17: delete "comprise" and insert --comprises--